(12) United States Patent
Habibi et al.

(10) Patent No.: US 11,232,649 B2
(45) Date of Patent: Jan. 25, 2022

(54) METHOD AND SYSTEM FOR AUTOMATION, SAFETY AND RELIABLE OPERATION PERFORMANCE ASSESSMENT

(71) Applicant: PAS, Inc., Houston, TX (US)

(72) Inventors: Eddie Habibi, Houston, TX (US); Nick Cappi, Houston, TX (US); Dennis Ahrens, Houston, TX (US); Tim Hillebrand, Houston, TX (US); Rick Willett, Houston, TX (US); Sourabh Dash, Houston, TX (US)

(*) Notice: Subject to any disclaimer, the term of this patent is extended or adjusted under 35 U.S.C. 154(b) by 1889 days.

(21) Appl. No.: 14/716,842

(22) Filed: May 19, 2015

(65) Prior Publication Data
US 2015/0330872 A1    Nov. 19, 2015

Related U.S. Application Data

(60) Provisional application No. 62/000,435, filed on May 19, 2014.

(51) Int. Cl.
  *G07C 3/00* (2006.01)
  *G01M 99/00* (2011.01)
(52) U.S. Cl.
  CPC ............ *G07C 3/00* (2013.01); *G01M 99/005* (2013.01); *G01M 99/008* (2013.01)
(58) Field of Classification Search
  CPC ............ G05B 23/0272; G05B 13/048; G06F 11/0709; H04L 43/0823; G06Q 40/08
  USPC ................... 700/12, 110; 340/525; 702/179
  See application file for complete search history.

(56) References Cited

U.S. PATENT DOCUMENTS

| | | | |
|---|---|---|---|
| 4,675,147 A | | 6/1987 | Schaefer et al. |
| 5,859,885 A | * | 1/1999 | Rusnica ............ G05B 23/0272 340/525 |
| 6,618,691 B1 | | 9/2003 | Hugo |
| 7,076,695 B2 | | 7/2006 | McGee et al. |
| 7,289,935 B1 | | 10/2007 | Hugo |
| (Continued) | | | |

FOREIGN PATENT DOCUMENTS

WO    00/62256    10/2000

OTHER PUBLICATIONS

Jason P. Wright "Alarm Managment Standards and Best Practices" pp. 1-50, Copyright 2011 Rockwell Automation, Inc.*
(Continued)

*Primary Examiner* — Regis J Betsch
*Assistant Examiner* — Kaleria Knox
(74) *Attorney, Agent, or Firm* — Greenberg Traurig, LLP; Dwayne Mason; Lennie Bersh

(57) ABSTRACT

In accordance with various embodiments described herein are systems and methods for collecting and analyzing parameter and properties data from an operation and using the data to determining Automation Safety and Operations Performance (ASOP) metrics indicative of various performance aspects of a given operation. Some embodiments are systems and methods for determining one or more ASOP metrics or metrics selected from a group consisting of elements including but not limited to Alarm System Performance Metric, an Operator Loading Metric, a Controllability Performance Metric, a Proximity to Safety System Metric, a Demand on Safety Systems Metric, and a Control System Integrity Metric.

20 Claims, 14 Drawing Sheets

ASOP Metric

| ASPM | OLM | CLPM | PSSM | DSSM | CSIM |
|---|---|---|---|---|---|
| $c_1$ALMH + $c_2$ALMF + $c_3$ALMC + $c_4$ALMS + $c_5$ALMD + $c_6$ALMFO | $c_1$ASPM + $c_2$SPCM + $c_3$OPCM | $\frac{1}{n}\sum \mu(PV_i - SP_i) / C_i a_i$ | $\frac{1}{n_y T_y} \sum_{i=1}^{n_y} PBLP_i$ | # of safety system activations | $c_1$CSCM [TCM, GCM, PCIM] + $c_2$CSDM [BRM, CFDM] |
| Alarms Performance | Operator Loading | Controllability Performance | Safety Systems Proximity/Activations | | Control Systems Integrity |

(56) References Cited

U.S. PATENT DOCUMENTS

| | | | | |
|---|---|---|---|---|
| 2003/0110007 A1* | 6/2003 | McGee | ............... | G06F 11/0709 |
| | | | | 702/179 |
| 2010/0211192 A1* | 8/2010 | Stluka | ................. | G06F 16/2477 |
| | | | | 700/12 |
| 2012/0083917 A1* | 4/2012 | Zhou | .................... | G05B 13/048 |
| | | | | 700/110 |
| 2013/0290783 A1* | 10/2013 | Bowler | ............... | H04L 43/0823 |
| | | | | 714/25 |
| 2014/0058763 A1* | 2/2014 | Zizzamia | ............... | G06Q 40/08 |
| | | | | 705/4 |

OTHER PUBLICATIONS

"Alarm Trips: The Ups and Downs" (Year: 2010).*
Thieullen Application of Principal Components Analysis to Improve Fault Detection and Diagnosis on Semiconductor (Year: 2013).*
Wright "Alarm Management Standards and Best Practices". (Year: 2011).*
"Alarm Trips: The Ups and Downs". (Year: 2016).*
Gerry, John et al.; The Link Between Automation KPIs and Enterprise KPIs; 2005; 7 pages; ExperTune, Inc.
Plant Triage, Plant Performance Dashboard; 1 page; www.expertune. com.
Mitchell, Warren et al.; A Picture Worth a Thousand Control Loops: An Innovative Way of Visualizing Controller Performance Data; 12 pages.

* cited by examiner

METHOD AND SYSTEM FOR AUTOMATION, SAFETY AND RELIABLE OPERATION PERFORMANCE ASSESSMENT

STATEMENT REGARDING FEDERALLY FUNDED RESEARCH

Not Applicable

NAMES OF THE PARTIES TO A JOINT RESEARCH AGREEMENT

Not Applicable

SEQUENCE LISTING, TABLE OF COMPUTER REFERENCE AND INCORPORATION THEREOF

Not Applicable

FIELD OF TECHNOLOGY

Embodiments of the disclosure relate to assessment and/or optimization of industrial processes, and more specifically to comparative analysis of industrial process unit(s) to assess and/or optimize performance of industrial processes. Further, at least some embodiments of the disclosure relate to determining factors for use in comparative analysis of a collection of or individual industrial process units to facilitate the assessment and optimization of safety and reliable operation performance of industrial processes.

BACKGROUND

Industrial organizations utilize various metrics to determine and assess different aspects of the organizations' behavior or performance. For example, performance metrics can be constructed to assess effectiveness, efficiency, safety, or reliability of industrial units or processes, or to determine appropriate levels of internal controls for an operation.

In light of the advancements in data collection and transmission, and the powerful data processing capabilities of computerized Distributed Control Systems (DCS), modern industrial facilities can utilize systems or methods to collect and transmit information not previously collectable, collected, or timely transmittable. Consequently, such facilities can also utilize systems and methods capable of and designed for rapid or real-time determination of a variety of metrics intimately related to process plant or process facility operation, such as safety, reliability, or the efficiency of one or more units. Furthermore, the aforementioned technological advancements also provide for various avenues through which information can be more quickly and effectively communicated to the personnel involved in such operations. Collectively, therefore, the foregoing provides for systems and methodologies that maximize the overall situation awareness for industrial organizations or facilities by determining unique and high value metrics that measure important aspects of the operation.

SUMMARY

In accordance with various embodiments hereinafter described, are systems and methods for collecting and analyzing (e.g., parameter and property) data from an operation, using the data to determine Automation, Safety, and Operations Performance (ASOP) metrics or factors indicative of the performance of a given operation, distributing the data and/or one or more of the calculated factors across a computer network, normalizing and displaying the metrics calculated using the algorithms and methods disclosed herein. In some embodiments, the target operation pertains to one or more control systems or alarm systems associated with parameter or property of a facility or plant. In one embodiment, the industrial process unit may be continuous, such as the fluidized catalytic cracking unit (FCCU) in a refinery; a semi-continuous process such as the coking unit in a refinery or a batch process such as a polymer unit.

In accordance with some embodiments are systems and methods for determining Automation, Safety, and Operations Performance (ASOP) metrics. In some embodiments, the determined metrics target one or more of asset inventory, compliance, automation personnel staffing efficiency, operator workload, and automation system performance. In some embodiments, the performance factors are built exclusively around the automation system to measure improvements and aid in decision making for automation and operations personnel in the maintenance and optimization of existing systems as well as system upgrade initiatives for future improvements.

In accordance with some illustrative embodiments is a system and method for determining an Alarm System Performance Metric (ASPM), which is reflective of the alarm system's performance. Yet another embodiment is a system and a method for determining an Operator Loading Metric (OLM), which measures the amount of operator's interaction and involvement with the target system. Still another embodiment is a system and method for determining a Controllability Performance Metric (CLPM), reflective of control loops' ability to reject disturbances collectively. Another embodiment is a system and method for determining a Proximity to Safety System Metric (PSSM), which tracks the operation's proximity to safety system trip settings. Still another embodiment is a system and method for determining a Demand on Safety Systems Metric (DSSM), which tracks the number of incidents when the safety system's trip limits are violated. Yet another embodiment is a system and method for determining a Control System Integrity Metric (CSIM), which assesses the stability and accuracy of the control system's configuration. In some embodiments, the above-listed metrics are determined as indicative of safe and reliable operation and automation of the target system.

Some embodiments are systems and methods for determining one or more ASOP metrics selected from a group consisting of, neither exclusively nor inclusively, an ASPM, an OLM, a CLPM, a PSSM, a DSSM, and a CSIM. Thus, an example of the calculation of the composite ASOP Metric could be $c_1 ASPM + c_2 OLM + c_3 CLPM + c_4 PSSM + c_5 DSSM + c_6 CSIM$, where the $c_x$ are weighting coefficients for the individual components of the composite.

In some embodiments, the reporting of one or more ASOP metrics of interest are made readily available to and/or displayed for the operating personnel in a customizable dashboard environment to reflect the current and/or historical performance over a single or multiple time period(s). In some embodiments, the ASOP metric comprises at least one of the Alarm System Performance Metric (ASPM), Operator Loading Metric (OLM), Controllability Performance Metric (CLPM), Proximity to Safety System Metric (PSSM), Demand on Safety Systems Metric (DSSM), and Control System Integrity Metric (CSIM). The ASOP metric may be used collectively or individually or a subset thereof as measures of overall automation safety and operations performance. The composite reflects the safe operating status of the plant or unit based on a normalized scale for benchmarking similar unit safe operating performance. It also reflects the safe operating status of a plant or unit based on normalized scale for use in a standalone mode against a unit's own historical performance.

In some embodiments, ASPM is calculated as $c_1$ALMH+ $c_2$ALMF+$c_3$ALMC+$c_4$ALMS+$c_5$ALMD+$c_6$ALMFO. In one embodiment, ALMH is percentage of hours containing more than a specified number of alarms. In one embodiment, alarm counts are weighted from the highest priority, P1, to middle priority P2, to lowest priority P3. In one embodiment, chattering alarms and alarm counts from ALMF (% time in flood) are removed from the calculation of ALMH. ALMF is the percentage of time in flood. In one embodiment, alarm flood begins when a specified number of alarms is exceeded within a specified period of time, and ends when the rate of alarms occurring has dropped below a specified alarms per minute threshold. In one embodiment, chattering alarms are removed from the calculation of ALMF. ALMC is the percentage of chattering alarms. In one embodiment, chattering alarm is considered as the number of reoccurring alarms in a specified period of time. ALMS is the percentage of stale alarms. In one embodiment, a stale alarm is an alarm that has been standing for more than a specified period of time. ALMD is the percentage of alarms currently disabled. High number of alarms removed from service is indicative of a mismanaged alarm system or instrumentation. ALMFO is the percentage of frequently occurring alarms. In one embodiment, ALMFO is the percentage of overall alarm load due to the frequently occurring alarms.

In one embodiment, the ASPM weighting coefficients are determine as follows: first, an average performing alarm system is defined to have an ASPM value of 0.5. Next, the percent contribution of each sub-metric to the overall ASPM is defined. In one embodiment, the percent contributions can be configured to meet specific alarm objectives based on the site's alarm philosophy. For example, if alarm floods and chattering alarms are of highest concern to operating personnel, then ALMF and ALMC can be weighted higher than others. Using these predetermined values, the set of simultaneous linear equations are solved for $c_1$ through $c_6$.

In some embodiments, a system and method is provided for determining OLM, which is determined as $c_1$ASPM+ $c_2$SPCM+$c_3$OPCM. SPCM is the Set Point Changes Metric, which is the number of set point changes above a predetermined average value (X). In one embodiment, metric normalization is based on the difference between the number of set point changes and (X), divided by (X). OPCM is Other Operator Changes Metric, which is the total number of changes above a predetermined average value of (Y). In one embodiment, "other" changes include Alarm Enable States, Alarm Trip limits, Tuning Constants, and Range changes. In one embodiment, the OLM weighting coefficients, $c_1 \ldots c_3$, are determined as follows: first, the average operator load of the system is defined and assigned an OLM value of 0.5. Next, the percent contribution of each sub-metric to the overall OLM is then defined. In one embodiment, targets are set for each sub-metric based on performance of actual plant and industry data: OLM consists of weighted sub-metrics including but not limited to, SPCM and OPCM. Using these predetermined values, the set of simultaneous equations are solved for $c_1$ through $c_3$.

In one embodiment, system and method is provided for determining Controllability Performance Metric (CLPM) using the formula:

$$\frac{1}{n}\sum_{i=1}^{n} \frac{\mu(|PV_i - SP_i|)}{C_i \sigma_i}$$

Where n is the number of control loops, PV is the present value, i.e., the current value of the process variable, SP is the set point or target value, $\mu$ is the average of the absolute value of the error over the time interval under consideration, $\sigma$ is the standard deviation of the error over the interval, $C_i$ is the factor of standard deviation normalization. The higher this value, the worse the performance of the control loop.

The Proximity to Safety System Metric (PSSM) is a key measurement that provides indication of the amount of time a process excursion is at risk of tripping a shutdown interlock, or a safety system. When a process variable exceeds the alarm limit but is below the trip limit, the situation poses a significant threat to the process. The closer the excursion approaches the trip limit, combined with the amount of time the excursion remains above the alarm limit will be the makeup of the Proximity to Safety System Metric. In some embodiments, system and method is provided for determining PSSM, calculated as $$\frac{1}{N_{LP}T_W}\sum_{i=1}^{n} PBLP_i$$

where, $PBLP_i$ is the area under the curve of the process excursion for process value i between the alarm limit and the trip limit, $N_{LP}$ is the number of limit pairs, and $T_w$ is the time window of calculation. PSSM will be the summation of all such integrals for every measured excursion.

The Demand on Safety System Metric (DSSM) counts the number of safety system activations. In some embodiments the trip limits of the safety system are weighted by Low, Medium, and High Priority. In one embodiment, the normalization of the DSSM is achieved by dividing the number of exceeded trip limits by the total number of configured trip limits.

The Control System Integrity Metric (CSIM) measures the stability and integrity of the Distributed Control System (DCS). In some embodiments, a system and method is provided for determining CSIM as $c_1$CSCM+$c_2$CSDM, where CSCM is Control System Changes Metric (measure of stability), and CSDM is Control System Defects Metric (measure of integrity). In one embodiment, the Control System Changes Metric (CSCM) is in turn a summation of three change sub-metrics—tag changes, graphic changes, and program changes as follows: CSCM=$c_1$TCM+$c_2$GCM+ $c_3$PCM. The TCM is the Tag Changes Metric measured as Number of Tag Changes/Total Tag Count; GCM is the Graphic Changes Metric measured as Number of Graphic Changes/Total Graphics Count; PCM is the Program Changes Metric measured as Number of Program Changes/ Total Program Count. The $c_1 \ldots c_3$ are weighting coefficients. In some embodiments, to determine $c_1 \ldots c_3$ for CSCM, an average performing system is first defined to have a CSCM value of 0.5. The percent contribution of each sub-metric to the overall CSCM is then defined. A set of simultaneous equations are then solved for $c_1$ through $c_3$. In one embodiment, the weighting coefficients are validated by deriving new sub-metric target values by taking 10% of the average values for the lower end estimate, and 190% for the upper estimate. These two percentages define the bounds for 'excellent' and 'poor' performing systems respectively. The 'good' and the 'bad' performing systems are estimated by taking 35% and 165% of the average performing system.

In some embodiments, system and method is provided for determining Control System Defects Metric (CSDM). CSDM is made up of several sub-metrics as follows: $CSDM = c_1 BRM + c_2 CFDM$; BRM is the Broken References Metric measured as the number of broken references divided by the number of total references; CFDM is the Control Files (programs and graphics) Defects Metric. In one embodiment, a root solving technique can then be used to solve system of equations for $c_1$ and $c_2$.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
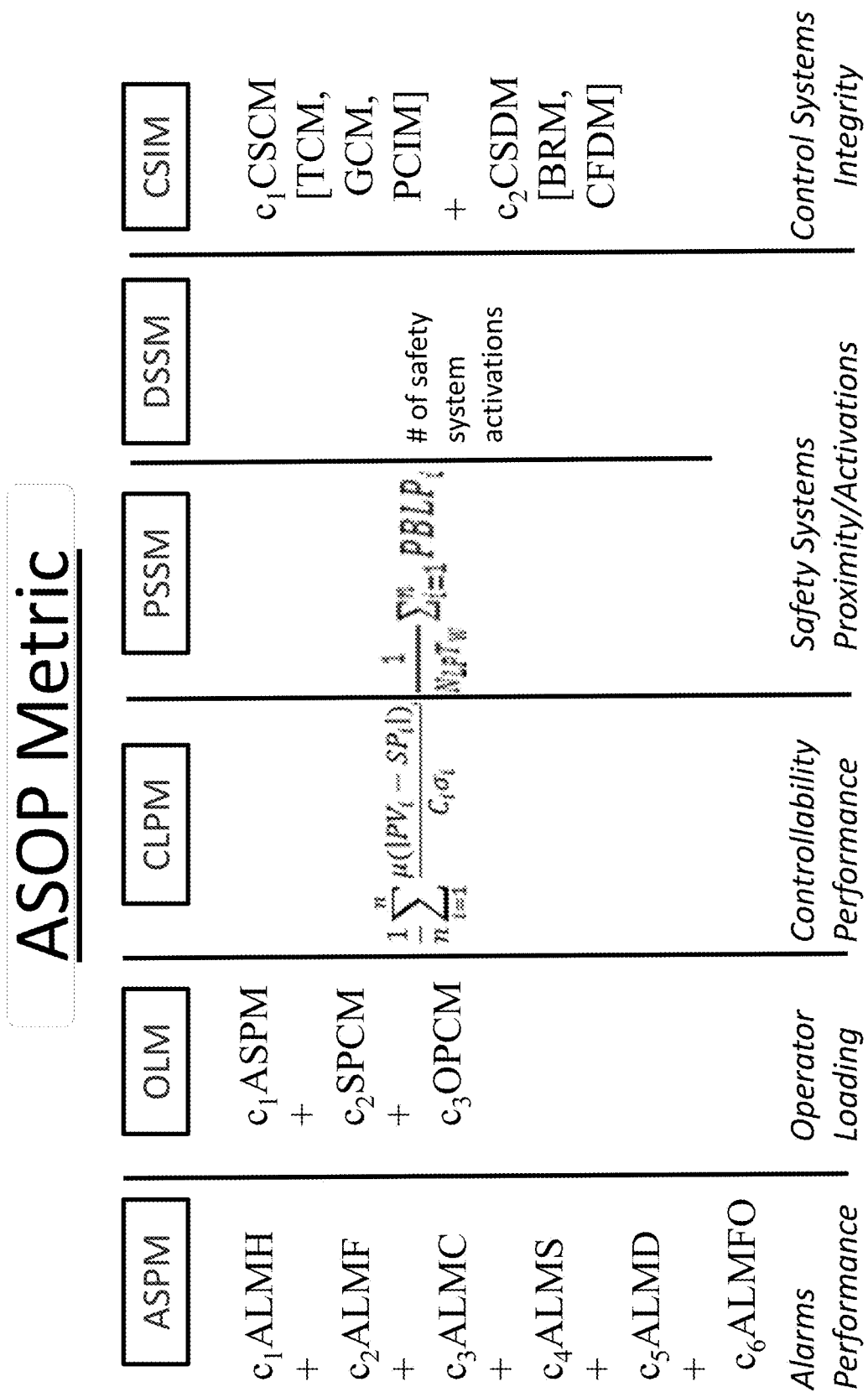
FIG. 1 is a graphical depiction of the ASOP metric and the sub-metrics.

Detailed embodiments of the present system and methods are disclosed herein; however, it is to be understood that the disclosed embodiments are merely illustrative of the system and methods that may be embodied in various forms. In addition, each of the examples given in connection with the various embodiments of the systems and methods are intended to be illustrative, and not restrictive. Further, the drawing figures are not necessarily to scale, some features may be exaggerated to show details of particular components. In addition, any measurements, specifications and the like shown in the figures are intended to be illustrative, and not restrictive. Therefore, unless clearly stated otherwise, specific structural and functional details disclosed herein are not to be interpreted as limiting, but merely as a representative basis for teaching one skilled in the art to variously employ the present invention.

A persistent and unsolved problem in modern plants or facilities ('plant' and 'facility' are used interchangeably herein) is that there is a plethora deluge of operational data that is constantly being generated. Every minute thousands of data points are being acquired, and technology keeps the data volume increasing, sometimes exponentially. For the most part, this very important data just resides on computers and the data are pulled in on-demand depending on the perceived need by different sets of people on a subjective basis.

However it is critical for operators to have situational awareness of operations across the enterprise, so that any developing problems are caught early and corrective action taken. Even during normal operations, enhanced situational awareness can help to enable significantly optimized operations.

Currently, disparate monitoring applications are deployed that examine different aspects of operations (e.g., concentration on alarms is one such view), but restricted views of single aspects may fail to provide a comprehensive view of the entire process. Lacking this comprehensive and integrated view, some processes are sub-optimized due to lack of attention and in the worst cases can lead to incidents with economic and safety impacts.

To understand the full picture, the systems and methods disclosed herein provides concrete and holistic views to operations. This allows operators to track operationally current performance system-wide, compare performances against history, as well as compare performance of one unit against other similar units (benchmarking) and thus identify root causes to fix and areas to optimize. Embodiments provided herein therefore allow operators to build an "eye into the process" facility-wide, for example using 'radar plots' as described herein that provide a simple and intuitive visualization of where the "process might be headed." The systems and method provide for a systematic process to normalize the metrics allowing visualization for performance tracking as well as comparison against similar units.

The present invention provides methods and systems for improved process reliability, safety and profitability by providing comprehensive metrics for plant operator situational awareness. The metrics allow proactive monitoring of facility operations and provide leading indicators of developing abnormalities thus helping avoid unplanned production interruptions. The metrics also provide for intuitive visualization of data collected across facility operations and thus allow plant personnel to be more effective in assimilating and acting on the diagnostic information. With thousands of real-time sensors collecting facility parameter and properties data every minute in modern facilities, it is critical to be able to condense the information into actionable relevant summaries that distill the essence of plant performance, looking past the 'noise' in the data. Decision support information is incorporated into progressive level of displays that allow for 'drill-down' to the relevant sections of the facility needing attention. In particular, the focus is on alarm systems performance data, the situational demand on operating personnel (operator actions tracking), metrics for controllability performance of control loops, the overall demand on the safety systems and the integrity of the distributed control system (DCS).

The level of situational awareness provided by the method and system disclosed herein provides operation personnel with significantly increased real-time comprehension of entire operational systems, affording early indications of system abnormalities so as to enable initiation of timely corrective actions to proactively prevent major escalations.

The system and method provided here uses a set of metrics illustrated in Table 1 that provides a reference of the metrics that will be further explained below with reference to FIG. 1. Table 1 is a tabulated summary of the metrics and their sub-metrics.

TABLE 1

Metrics and sub-metrics

| Metric | Description |
|---|---|
| ASOP | Automation, Safety and Operations Performance Composite Metric |
| ASPM | Alarm System Performance Metric |
| ALMH | Percentage of hours containing more than a specified number of alarms |
| ALMF | Percentage of time in flood |
| ALMC | Percentage of chattering alarms |
| ALMS | Percentage of stale alarms |
| ALMD | Percentage of alarms currently disabled |
| ALMFO | Percentage of frequently occurring alarms |
| OLM | Operator Loading Metric |
| ASPM | Alarm System Performance Metric |
| SPCM | Setpoint changes Metric = (Nsp − X) / X |
| OPCM | Other operator changes Metric |
| CLPM | Contollability Performance Metric $\frac{1}{n}\sum_{i=1}^{n} \frac{\mu(|PV_i - SP_i|)}{C_i \sigma_i}$ |
| PSSM | Proximity to Safety System Metric |
| PBLP | Process area between alarm/trip limit pairs $\frac{1}{N_{LP}T_W}\sum_{i=1}^{n} PBLP_i$ |
| TLP | Count of limit pairs |
| Tw | Time window of calculation |
| DSSM | Demand on Safety Systems Metric |
| CSIM | Control System Integrity Metric |
| CSCM | Control System Changes Metric |
| TCM | Tag Changes Metric = Tag changes/Total tag count |
| GCM | Graphic Changes Metric = Graphic changes/Total graphic count |
| PCM | Program Changes Metric = Program changes/Total program count |
| CSDM | Control System Defects Metric |
| BRM | Broken References Metric = # of broken references/# of total references |
| CFDM | Control Files Defects Metric = # of control files with defects/# of total control files |

As illustrated in FIG. 1, the ASOP Metric is comprised of many or all of the metrics in Table 1.

The ASOP systems and methods collect and analyze data from an operation, using the data to determine Automation, Safety, and Operations Performance (ASOP) metrics or factors indicative of the performance of a given operation, distributing the data and/or one or more of the calculated factors across a computer network, normalizing and displaying the calculated metrics. Target operations may pertain to one or more control systems or alarm systems of an industrial facility. In one embodiment, the industrial process unit may be continuous, such as the fluidized catalytic cracking unit (FCCU) in a refinery; in other embodiments a semi-continuous process such as the coking unit in a refinery or a batch process such as a polymer unit.

The determined metrics target one or more of asset inventory, compliance, automation personnel staffing efficiency, operator workload, and automation system performance. In some embodiments, the performance factors are built exclusively around the automation system to measure improvements and aid in decision making for automation and operations personnel in the maintenance and optimization of existing systems as well as system upgrade initiatives for future improvements.

As illustrated in FIG. 1 the ASOP system and method comprise an Alarm System Performance Metric (ASPM), which is reflective of the alarm system's performance, an Operator Loading Metric (OLM) for operator tracking, which measures the amount of operator's interaction and involvement with the target system. Another aspect of the system and method comprises a Controllability Performance Metric (CLPM), or control loops performance metric, reflective of control loops' ability to reject disturbances collectively. Still another aspect of the ASOP system and method comprises a Proximity to Safety System Metric (PSSM), a performance metric which tracks the operation's or processes proximity to safety system trip settings. A Demand on Safety Systems Metric (DSSM) is a performance metric that tracks the number of incidents when the safety system's trip limits are violated. Another aspect of the system and method comprises a Control System Integrity Metric (CSIM), a performance metric which assesses the stability and accuracy of the control system's configuration. The above-listed metrics provide indications of safe and reliable operation and automation of the target system, or alternatively, provide intuitively clear indications of abnormalities in processes or facility parameters and properties that also indicate the most pressing issues for operations personnel to address in connection with the operation of a facility. Examples of chemical plant and refinery process parameters and properties that relate to a facilities performance and which are monitored through the use of sensors include but are not limited to pressure, temperature, flow rate, pressure drop, production, consumption, composition, decomposition, physical or chemical characteristics, combustion, volume, yield, energy, work, oxidation state, precipitation, reactions, pH, boiling point, characterization factors, vapor pressure, viscosity, ° API, enthalpy, flash point, and pour content. Moreover, according to the novel system and methods disclosed herein, these as well as other process or facility parameters and properties associated with a facility may be monitored, controlled and analyzed by utilizing sensors through which the sensed data and associated new metrics are developed or determined and analyzed for improved plant operator situational awareness and to improve process/facility reliability, safety and profitability.

With reference to Table 1 and FIG. 1, some embodiments are systems and methods for determining one or more ASOP metrics selected from a group consisting of, neither exclusively nor inclusively, an ASPM, an OLM, a CLPM, a PSSM, a DSSM, and a CSIM. Thus, an example of the algorithm comprising the composite ASOP Metric could be $c_1$ASPM+$c_2$OLM+$c_3$CLPM+$c_4$PSSM+$c_5$DSSM+$c_6$CSIM, where each of the $c_x$ are weighting coefficients for the individual components of the composite.

In some embodiments, the reporting of one or more ASOP metrics of interest are made readily available to and/or displayed for the operating personnel in a customizable dashboard environment to reflect the current and/or historical performance over a single or multiple time period(s). In some embodiments, the ASOP metric comprises at least one of the Alarm System Performance Metric (ASPM), Operator Loading Metric (OLM), Controllability Performance Metric (CLPM), Proximity to Safety System Metric (PSSM), Demand on Safety Systems Metric (DSSM), and Control System Integrity Metric (CSIM). The ASOP metric may be used collectively or individually or a subset thereof as measures of overall automation safety and operations performance. The composite reflects the safe operating status of the plant or unit based on a normalized scale for benchmarking similar unit safe operating performance. It also reflects the safe operating status of a plant or unit based on normalized scale for use in a standalone mode against a unit's own historical performance.

Alarm System Performance Metric (ASPM)

In accordance with some illustrative embodiments is a system and method for determining an Alarm System Performance Metric (ASPM), which is reflective of the alarm system's performance and efficiency thereof. ASPM communicates the overall health of the alarm system. Most facilities have adopted an alarm philosophy for alarms design and implementation that covers classification of alarms as emergency, high, or low priority; setting alarm limit and trip limits and the operator action to initiate in the event of alarm activation. The alarm system health is a significant measure to the overall safe and reliable performance of any industrial process. In one embodiment, the reported ASPM is scaled to range between 0 and 1, with 0 being an excellently performing system, and 1 being a poorly performing system.

In some embodiments, ASPM is a collection of sub-metrics based on criteria for alarm performance in the ISA-18.2 standard for measuring the performance of an alarm system. In such embodiments, each sub-metric is weighted by a coefficient and summed into a single metric. The ASPM calculation may include only annunciated alarms at the console.

In one embodiment, ASPM is calculated as:

$$ASPM = c_1 ALMH + c_2 ALMF + c_3 ALMC + c_4 ALMS + c_5 ALMD + c_6 ALMFO$$

Figure 2:
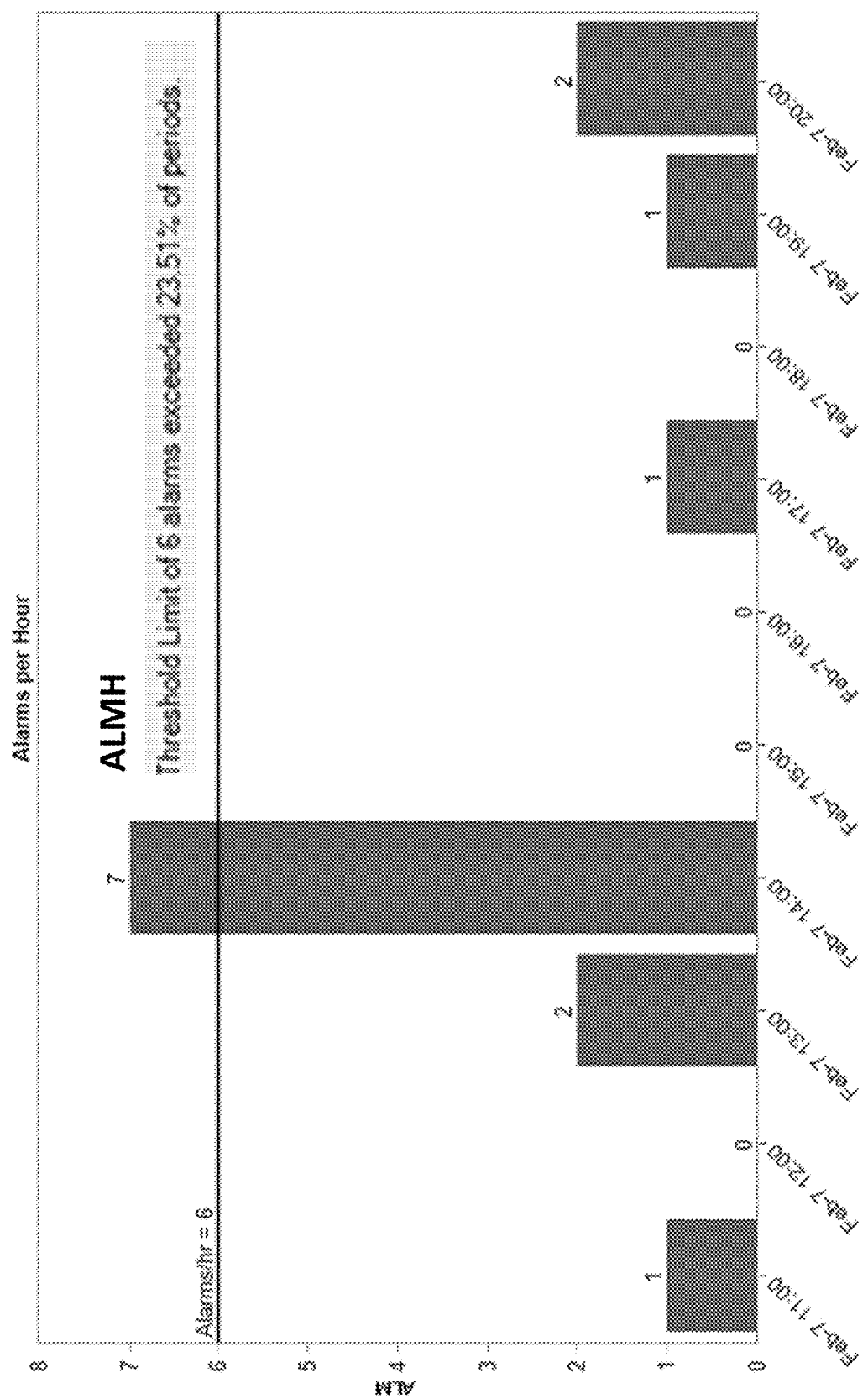
FIG. 2 shows an example of a time period where alarms per hour exceeds a threshold of 6 (ALMH)

ALMH is percentage of hours containing more than a specified number of alarms. For example, in several plants, an alarm philosophy may dictate a maximum of 6 alarms per hour (one per 10 minutes). In such an instance, ALMH can be defined as percentage of hours containing more than 6 alarms. FIG. 2 illustrates an example of time periods where alarms per hour exceed 6. In this example, the threshold of six alarms per hour is exceeded in 23.51% of the time periods. In one embodiment, alarm counts are weighted from the highest priority P1, to middle priority P2, to lowest priority P3. In order to evaluate sustained alarm performance, chattering alarms and alarm counts from ALMF (% time in flood) are removed from the calculation of ALMH.

Figure 3:
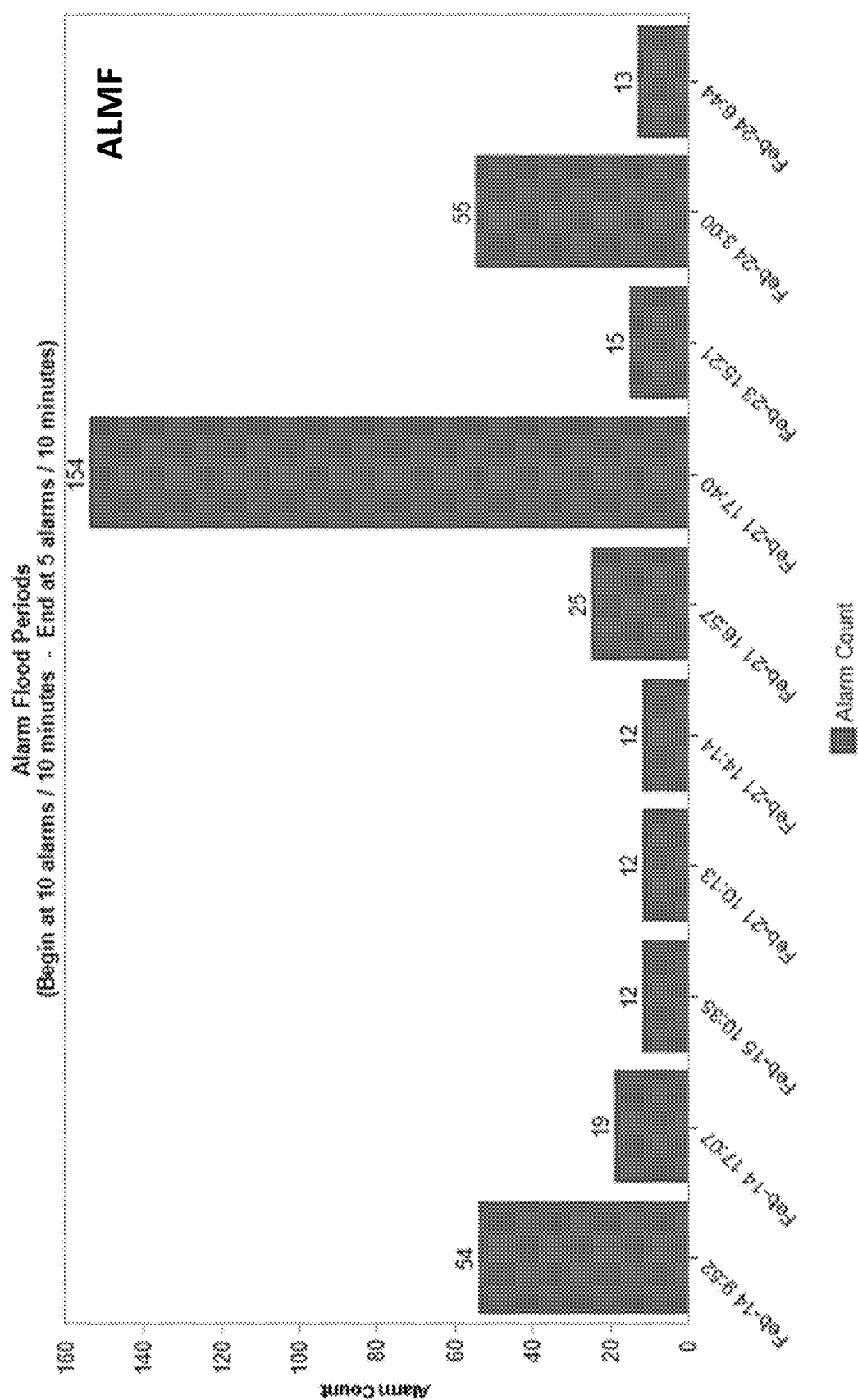
FIG. 3 shows an example of alarm floods (ALMF)
Figure 4:
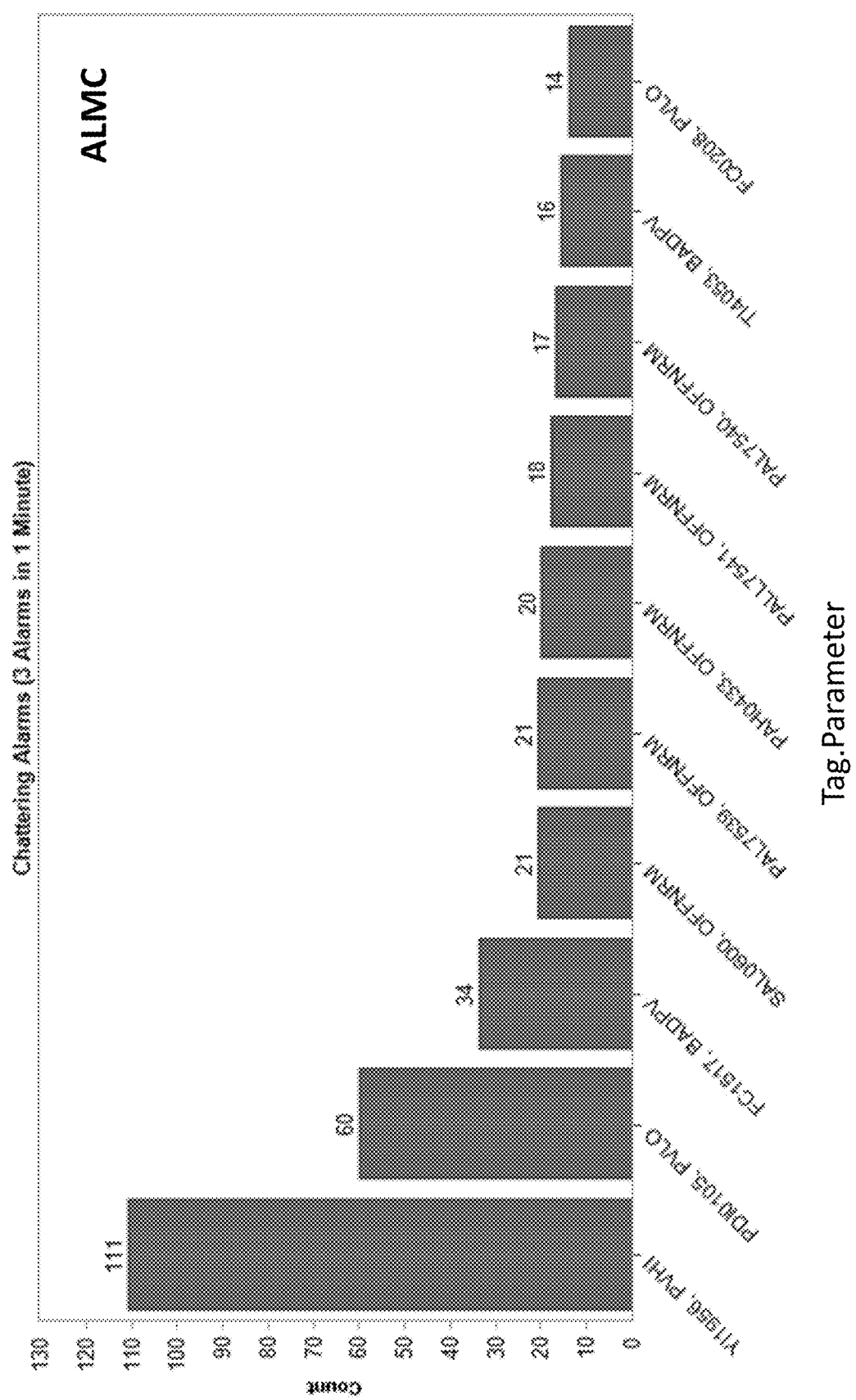
FIG. 4 shows an example of chattering alarms (ALMC).

ALMF is the percentage of time in flood, which is reflective of the likelihood of an operator missing an alarm. In one embodiment, alarm flood begins when a specified number of alarms is exceeded to occur within a designated interval of time, and ends when the rate of alarms occurring drops below a specified threshold for a designated period of time. For example, an alarm flood may be defined to start when at least 10 alarms are generated in 10 minutes and may be defined to end when the alarm rate drops to below 5 alarms per 10 minutes. FIG. 3 illustrates an example of alarm flood. ALMC is the percentage of chattering alarms. Frequently, chattering alarms are a high contributor to the overall alarm load. Chattering alarms are removed from the calculation of ALMF. For example, one definition of chattering alarms is 3 alarms in 1 minute. FIG. 4 shows an example of chattering alarms where the count exceeds 3 in a 1 minute period.

ALMS is the percentage of stale alarms. Alarms left standing for long periods of time clutter alarm displays and interfere with the operator's ability to detect and respond to new meaningful alarms. In one embodiment, a stale alarm is an alarm that has been standing for more than twenty-four (24) hours.

ALMD is the percentage of alarms currently disabled. High number of alarms removed from service is indicative of a mismanaged alarm system or instrumentation.

Figure 5:
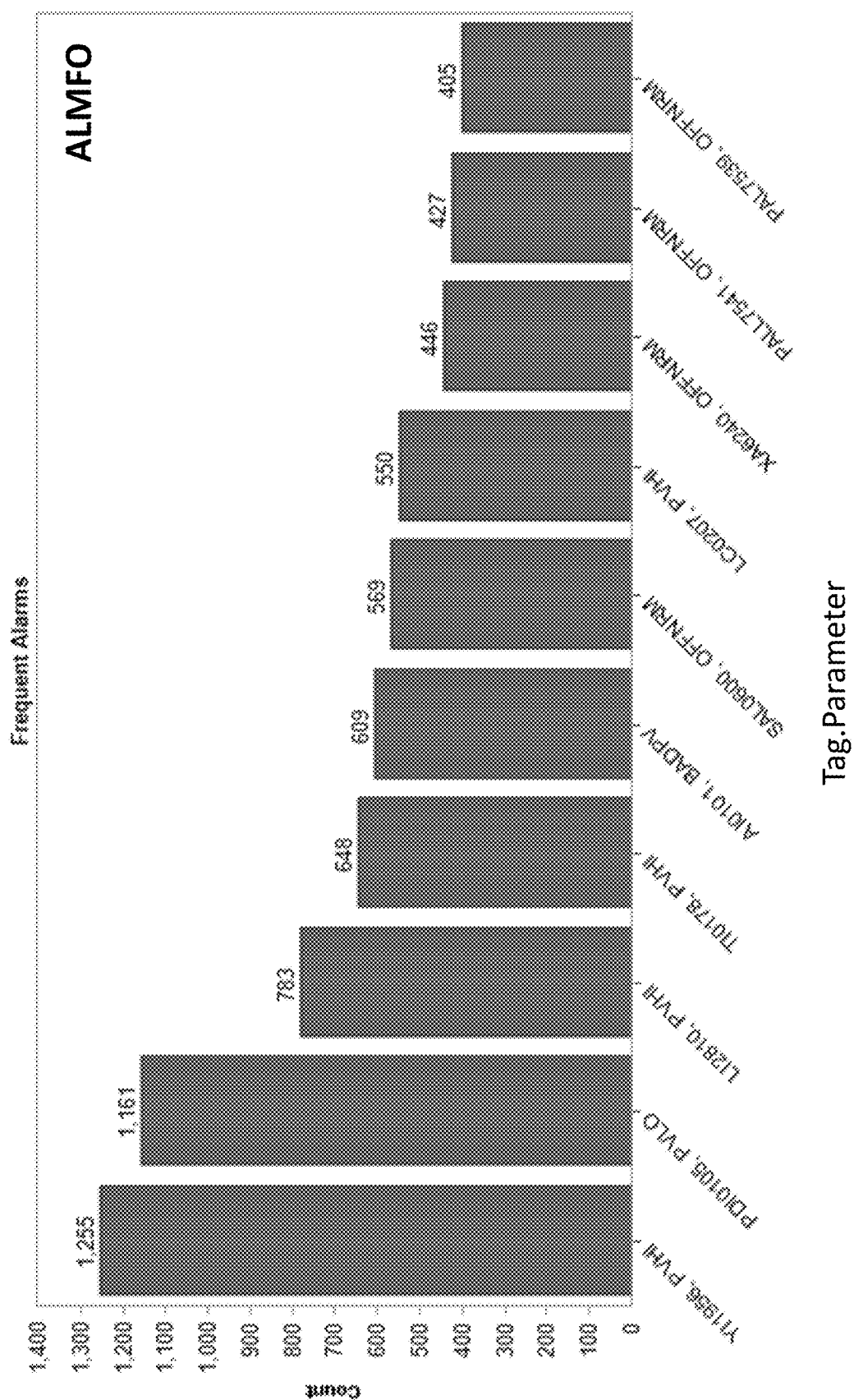
FIG. 5 illustrates an example of a top ten frequently occurring alarms (ALMFO) by count.

ALMFO is the percentage of frequently occurring alarms. In one embodiment, ALMFO is the percentage of overall alarm load due to most frequently occurring alarms. For example, a facility may consider the top 10 most frequently occurring alarms in this sub-metric. FIG. 5 illustrates an example of frequently occurring alarms.

The weighting coefficients, $c_1$-$c_6$ drive each sub-metric to contribute a percentage of the overall Alarm System Performance Metric. In one embodiment, the ASPM weighting coefficients are determined as follows: first, an average performing alarm system is defined to have an ASPM value of 0.5. The percent weight contribution of each sub-metric—wALMH; wALMF; wALMC; wALMS; wALMD; and wALMFO—to the overall ASPM is then defined. The sum of the percent contributions shall equal the value of 1. The targeted contributions are configurable based on alarm performance objectives. As an example illustrated in Table 2, if the plant or facility is most concerned about alarm floods and chattering alarms, the "set weight" contribution for wALMF and wALMC can be set at 35% and 25% respectively and the rest at 10% (Table 2). These contributions can also be based on historical plant performance. Alternatively, set weight contributions for any metric or sub-metric may be calculated according to methods or algorithms disclosed herein. The percent contributions are established or calculated for each sub-metric, including but not limited to: wALMH; wALMF; wALMC; wALMS; wALMD; and wALMFO.

TABLE 2

| ASPM | | Weight | % Contribution |
|---|---|---|---|
| ALMH | % Hours containing more than (6) alarms | wALMH | 10% |
| ALMF | % Time in Flood | wALMF | 35% |
| ALMC | % Chattering alarms | wALMC | 25% |
| ALMS | % Stale alarms | wALMS | 10% |
| ALMD | % Disabled alarms | wALMD | 10% |
| ALMFO | % Frequent alarms | wALMFO | 10% |

Using these predetermined values, the following algorithm provides a system of equations that are solved for $c_1$ through $c_6$:

$$0.50 = c_1 ALMH + c_2 ALMF + c_3 ALMC + c_4 ALMS + c_5 ALMD + c_6 ALMFO$$

$$wALMH = c_1 ALMH / (c_1 ALMH + c_2 ALMF + c_3 ALMC + c_4 ALMS + c_5 ALMD + c_6 ALMFO)$$

$$wALMF = c_2 ALMF / (c_1 ALMH + c_2 ALMF + c_3 ALMC + c_4 ALMS + c_5 ALMD + c_6 ALMFO)$$

$$wALMC = c_3 ALMC / (c_1 ALMH + c_2 ALMF + c_3 ALMC + c_4 ALMS + c_5 ALMD + c_6 ALMFO)$$

$$wALMS = c_4 ALMS / (c_1 ALMH + c_2 ALMF + c_3 ALMC + c_4 ALMS + c_5 ALMD + c_6 ALMFO)$$

$$wALMD = c_5 ALMD / (c_1 ALMH + c_2 ALMF + c_3 ALMC + c_4 ALMS + c_5 ALMD + c_6 ALMFO)$$

$$wALMFO = c_6 ALMFO / (c_1 ALMH + c_2 ALMF + c_3 ALMC + c_4 ALMS + c_5 ALMD + c_6 ALMFO)$$

The ASPM should be nearly normalized between a value of 0 for flawless performance, and 1 for very poor performance.

The Operator Loading Metric (OLM)

The Operator Loading Metric (OLM) for operator tracking is a measurement of the demand being placed on the operator based on the frequency of the operator's interaction with the control system. In various embodiments the OLM is part of an operator action tracking system or method.

In one embodiment, OLM is determined as a summation of sub-metrics each weighted by a coefficient. The coefficients $c_x$ for x=1 to 3, are determined based on operator loading objectives at the plant:

$$OLM = c_1 ASPM + c_2 SPCM + c_3 OPCM$$

As used above, ASPM is the Alarm System Performance Metric. SPCM is the Set Point Changes Metric, which is the number of set point changes above a predetermined average value (X). In one embodiment, metric normalization is based on the difference between the number of set point changes and (X), divided by (X). OPCM is Other Operator Changes Metric, which is the total number of changes above a predetermined average value of (Y). In one embodiment, "Other" changes could include Distributed Control System (DCS) changes such as changes in alarm states (enable/disable), changes in alarm trip limits, changes in tuning constants or ranges. The base level determination of X and Y may be based on normal facility operational data. For example, it is unusual to have the plant operator execute more than 60 changes in an hour (more than 1 a minute) under normal operation conditions; hence a baseline can be drawn at that level. These levels may be situational or site dependent.

The OLM weighting coefficients, $c_1 \ldots c_3$, drive each sub-metric to a desired contributing percentage of the overall Operator Loading Metric as follows: first, the average operator load of the system is defined and assigned an OLM value of 0.5. The percent weight contribution of each sub-metric—wASPM, wSPCM, wOPCM—to the overall OLM for operator action tracking is then defined. The sum of these contributions will be 1.0. In one embodiment, wASPM and wOPCM are weighed equally at 30% while wSPCM is set at 40% (as illustrated in Table 3). These contributions are configurable and can be set based on operator loading objectives or industry data.

TABLE 3

| | OLM | Weight | % Contribution |
|---|---|---|---|
| ASPM | Alarm System Performance Metric | wASPM | 30% |
| SPCM | Set Point Changes | wSPCM | 40% |
| OPCM | Other Changes | wOPCM | 30% |

Using these predetermined values, the following system of equations for solved for $c_1$ through $c_3$:

$$0.50 = c_1 ASPM + c_2 SPCM + c_3 OPCM$$

$$wASPM = c_1 ASPM / (c_1 ASPM + c_2 SPCM + c_3 OPCM)$$

$$wSPCM = c_2 SPCM / (c_1 ASPM + c_2 SPCM + c_3 OPCM)$$

$$wOPCM = c_3 OPCM / (c_1 ASPM + c_2 SPCM + c_3 OPCM)$$

The OLM should be nearly normalized between a value of 0 for flawless performance, and 1 for very poor performance.

Controllability Performance Metric (CLPM)

The Controllability Performance Metric (CLPM) is a measurement of how well the automation system keeps the process at desired performance targets. This is reflective of the stability of the process and how well the automation system is rejecting load disturbances. It is based on the variability in the difference between the current (present) value (PV) and target value (SP) of the controllers in the DCS. In one embodiment, CLPM is determined using the formula:

$$\frac{1}{n} \sum_{i=1}^{n} \frac{\mu(|PV_i - SP_i|)}{C_i \sigma_i}$$

Where n Number of control loops
$PV_i$ Present Value of the $i^{th}$ loop
$SP_i$ Setpoint or Target Value of the $i^{th}$ loop
$PV_i - SP_i$ Error (difference between PV and SP)
$\mu(|PV_i - SP_i|)$ Average of the absolute value of the error over the considered time interval
$\sigma_i$ The standard deviation of the error over the considered time interval.
$C_i$ Factor for standard deviation normalization. Using the 'three-sigma rule", a value of 2.5 is suggested as even for non-normally (non-Gaussian) distributed errors, 98% of the errors should fall within ±3σ.

Figure 6:
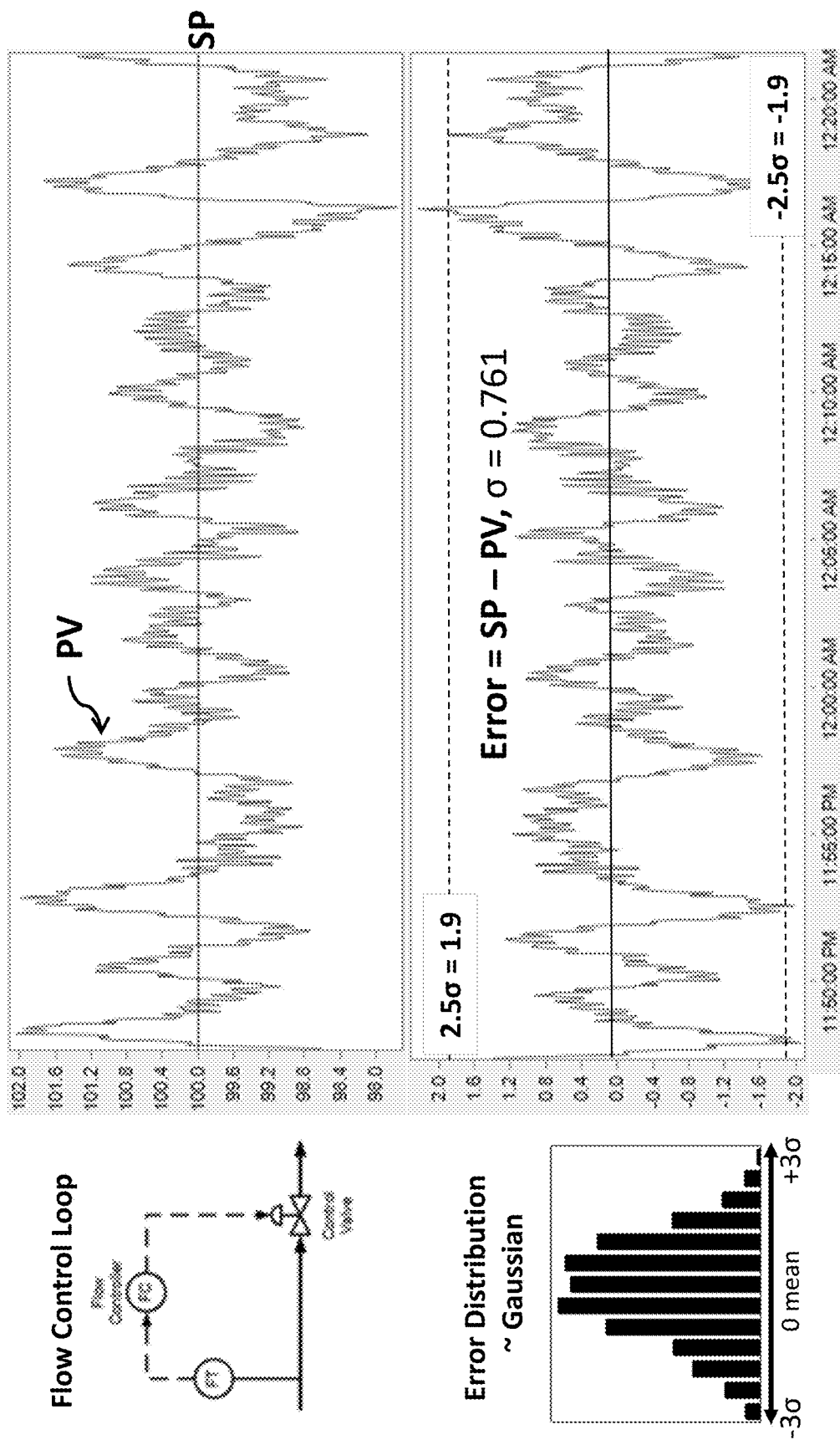
FIG. 6 illustrates flow control loop data for the CLPM.

The time interval of calculations is chosen to apply to all the control loops being considered (flow, temperature, level etc.). The interval is long enough to cover the variety of loop dynamics: ranging from fast flow control loops to slower level and pressure loops. A time period of around 2 hours is typically sufficient for the analysis. The time interval can be adjusted for situational or site dependencies. Existing facility best practices for control loops can also be employed to determine the time interval. The CLPM ranges between 0 for an excellently performing system to 1, for a poorly performing system. FIG. 6 shows an example of a flow control loop with the PV as a function of time, SP=100, and error equal to (SP−PV. The error oscillates around the '0' line as the PV swings around the SP. The error is likely to be distributed close to gaussian (normal) with zero mean. However, even in non-normal instances of distribution, nearly 98% of the data should lie within ±3σ ('three sigma rule'). In this example, with an error σ=0.761, nearly all the data lies within ±3σ. The suggested $C_i$ value of a slightly 'tighter' 2.5 is based on this rationale. The CLPM calculation for this example data yields 0.62, which indicates "average" performance.

Proximity to Safety System Metric (PSSM)

The Proximity to Safety System Metric (PSSM) is a key measurement that provides indication of the amount of time a process excursion from normal or otherwise specified ranges is at risk of tripping an interlock, or safety system. When a process variable crosses an alarm limit, the operator is alerted. Until the excursion returns below the alarm limit, the condition remains silently in effect, and the operator receives no additional warning until the excursion crosses the trip limit. Throughout the duration of such a situation a significant threat is posed to the process and so this metric provides for tracking and keeping the information grouped with other relevant information so that the importance of the threat is always currently available to the operations personnel.

Figure 7:
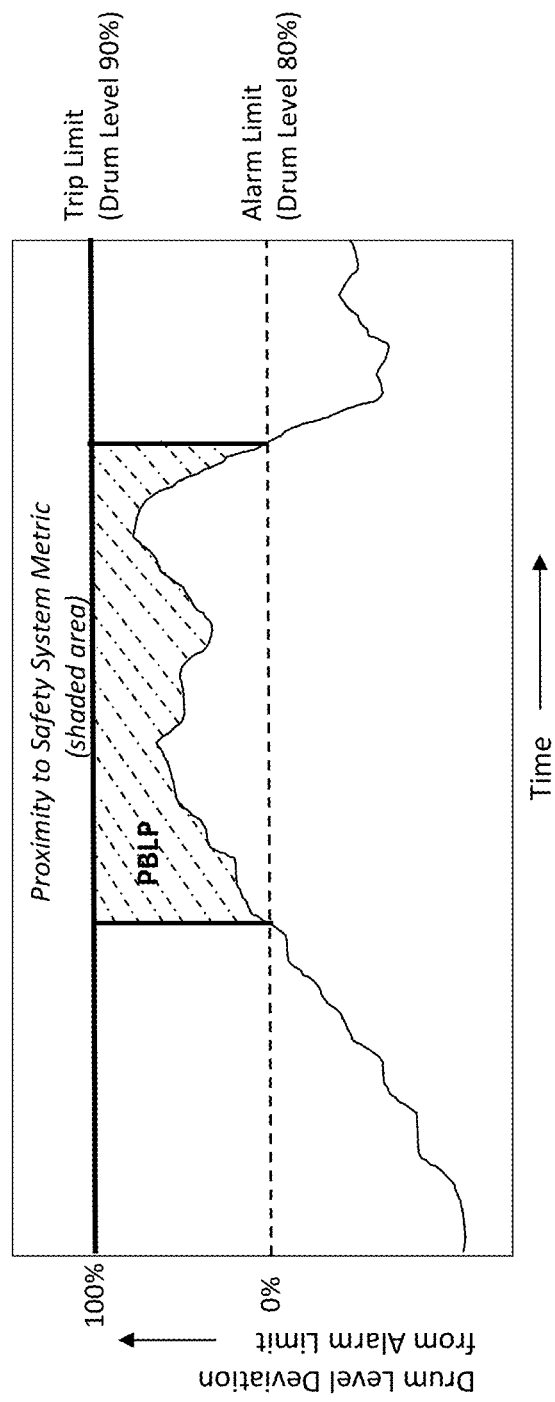
FIG. 7 is an illustrative graph representative of the Proximity to Safety System Metric according to various embodiments.

The closer the excursion approaches the trip limit, combined with the amount of time the excursion remains above the alarm limit makes up the PSSM. For example, FIG. 7 illustrates a situation that describes a suction drum-gas compressor layout, with the drum feeding the compressor. The concern in this scenario is that a high fluid level in the drum may result in liquid carryover into the compressor leading to damage or facility shutdown. In this example, the PSSM monitors proximity to the compressor trip limit (trip limit is 90% drum level) and accounts for both the deviation above the alarm limit (80% drum level) and the time spent above the alarm limit. The PSSM will integrate the region of the process excursion between the alarm limit and the trip limit. The Y-Axis in FIG. 7 will be expressed in percentage above the alarm limit, with 100% representing the vertical difference between the alarm limit and the trip limit. The closer the excursion is to the trip limit, the higher the percentage, and the closer the excursion is to the alarm limit, the lower the percentage. The units of the integral will be expressed in "Time-%". PSSM will be the summation of all such integrals for every measured excursion. In one embodiment, the normalization of the Time-% value calculated will occur by dividing the resulting value by the number of configured Trip limit/Alarm limit pairs, multiplied by the amount of time over which the metric is being considered:

$$PSSM = \frac{1}{N_{LP}T_W} \sum_{i=1}^{n} PBLP_i$$

where $PBLP_i$ is the Area Between Trip/Alarm limit pairs expressed as Time-%

$N_{LP}$ Count of Trip/Alarm limit pairs $T_w$ Rolling time window, configurable, set to an hour.

Demand on Safety System Metric (DSSM)

The Demand on Safety System Metric (DSSM) counts the number of times a trip limit has been exceeded. In one embodiment, trip limits are weighted by Low, Medium, and High Priority. For example, low priority alarms can be assigned a value of 1, medium priority alarms assigned a value of 3 and high priority a value of 5. The DSSM calculation would then account for the weight of the trips activated. In one embodiment, the normalization of the DSSM is achieved by dividing the number of exceeded trip limits multiplied by their corresponding weights divided by the total number of configured trip limits and their relevant weights.

Control System Integrity Metric (CSIM)

The Control System Integrity Metric (CSIM) gauges the stability and the accuracy of a DCS' configuration, which is a performance metric for a distributed control system' integrity. The stability of the system is based on two elements: (a) number of changes made to the system, and, (b) the number of defects (configuration changes that deviate from standard) found. An 'integrity' application detects, tracks and counts these changes and defects in the control system. The higher the frequency of changes in tags, schematics or programs, the more unstable the system, and the greater the risk is to the overall integrity of the system. For instance, an accidental deletion of schematic may at times go unnoticed until an operator tries to access it. A proactive 'integrity check' application will keep track of such unintended consequences. Likewise, a high number of defects represent potential system instability. The system's configuration accuracy can be determined by comparison against the plant's best practices or recognized industry standards. The more atypical a system's configuration, the higher the defect count, and the greater the risk is to the reliability of the system.

CSIM is comprised of sub-metrics, including but not limited to, Control System Changes Metric (CSCM) and the Control System Defects Metric (CSDM). In one embodiment, CSIM is determined as:

$$CSIM = c_1 CSCM + c_2 CSDM$$

where:

CSCM=Control System Changes Metric

CSDM=Control System Defects Metric

The coefficients $c_x$ are used to weight the sub-metrics. One example is to weigh them equally at 50% (Table 4).

TABLE 4

| | CSIM | Weight | Coefficient |
|---|---|---|---|
| CSCM | Control System Changes Metric | $c_1$ | 50% |
| CSDM | Control System Defects Metric | $c_2$ | 50% |

Control System Change Metric (CSCM)

The Control System Change Metric (CSCM) is the sum of three change sub-metrics—tag changes, graphic changes, and program changes.

$$CSCM = c_1 TCM + c_2 GCM + c_3 PCM$$

Where:

CSCM=Control System Changes Metric

TCM (Tag Changes Metric)=Number of Tag Changes/Total Tag Count

GCM (Graphic Changes Metric)=Number of Graphic Changes/Total Graphics Count

PCM (Program Changes Metric)=Number of Program Changes/Total Program Count $c_1 \ldots c_3$=Weighting coefficients To determine $c_1 \ldots c_3$ for CSCM, an average performing system is defined to have a CSCM value of 0.5. The percent weight contribution of each sub-metric—wTCM, wGCM, and wPCM—to the overall CSCM can be established per plant practices or historical data. For example, wTCM can be set to 40% and wGCM, wPCM equally weighted at 30% each. The sum of these contributions will be 1.0 as illustrated in Table 5.

TABLE 5

| | CSCM | Weight | % Contribution |
|---|---|---|---|
| TCM | Tag Changes Metric | wTCM | 40% |
| GCM | Graphic Changes Metric | wGCM | 30% |
| PCM | Program Changes Metric | wPCM | 30% |

The following system of equations for $c_1$ through $c_3$ can then be solved:

$$0.50 = c_1 TCM + c_2 GCM + c_3 PCM$$

$$wTCM = c_1 TCM / (c_1 TCM + c_2 GCM + c_3 PCM)$$

$$wGCM = c_2 GCM / (c_1 TCM + c_2 GCM + c_3 PCM)$$

$$wPCM = c_3 PCM / (c_1 TCM + c_2 GCM + c_3 PCM)$$

The weighting coefficients derived as such can be validated by estimating target values for each sub-metric on the lower and the higher side of the defined average performing system. In one embodiment, validation is done by deriving new sub-metric target values by taking 10% of the average values for the lower end estimate, and 190% for the upper estimate. These two percentages provide bounds for excellent and poor performing systems respectively. The good and the bad performing systems were estimated by taking 35% and 165% of the average performing system. Using the same weighting coefficients, CSCM at each defined level of performance can then be calculated for validation. The CSCM should be nearly normalized between a value of 0 for excellent performance, and 1 for poor performance.

Control System Defects Metric (CSDM)

The Control System Defects Metric (CSDM) measures deviation from industry standards and best practices. The more a system's configuration deviates from industry recognized best practices, the higher the risk for misconfiguration, and to plant reliability. In one embodiment, CSDM is made up of two sub-metrics as follows:

$$CSDM = c_1 BRM + c_2 CFDM$$

where:
CSDM=Control System Defects Metric
BRM=Broken References Metric
CFDM=Control Files Defects Metric
$c_1$, $c_2$=Weighting Coefficients The Broken References Metric (BRM) counts the total number of connections designed to have a linkage in the control system that are broken, thus creating 'orphaned' references. For example, a control logic may have been designed to have associations with 15 tags, but due to maintenance issues or oversight may be missing some of these links leading to underperformance or instability. Such situations are indicative of potential problems and lead to erratic behavior. In one embodiment, BRM is calculated as the number of broken references divided by the number of total object references. The Control Files Defects Metric (CFDM) counts the number of total files (programs and graphics) with defects divided by the total number of control files. In one embodiment, the coefficients are equally weighted at 50% (Table 6) or can be configured per facility practices (situational or site dependencies). The CSDM should be nearly normalized between a value of 0 for excellent performance, and 1 for very poor performance.

TABLE 6

| | CSDM | Weight | Coefficient |
|---|---|---|---|
| BRM | Broken References Metric | $c_1$ | 50% |
| CFDM | Control Files Defects Metric | $c_2$ | 50% |

Figure 8:
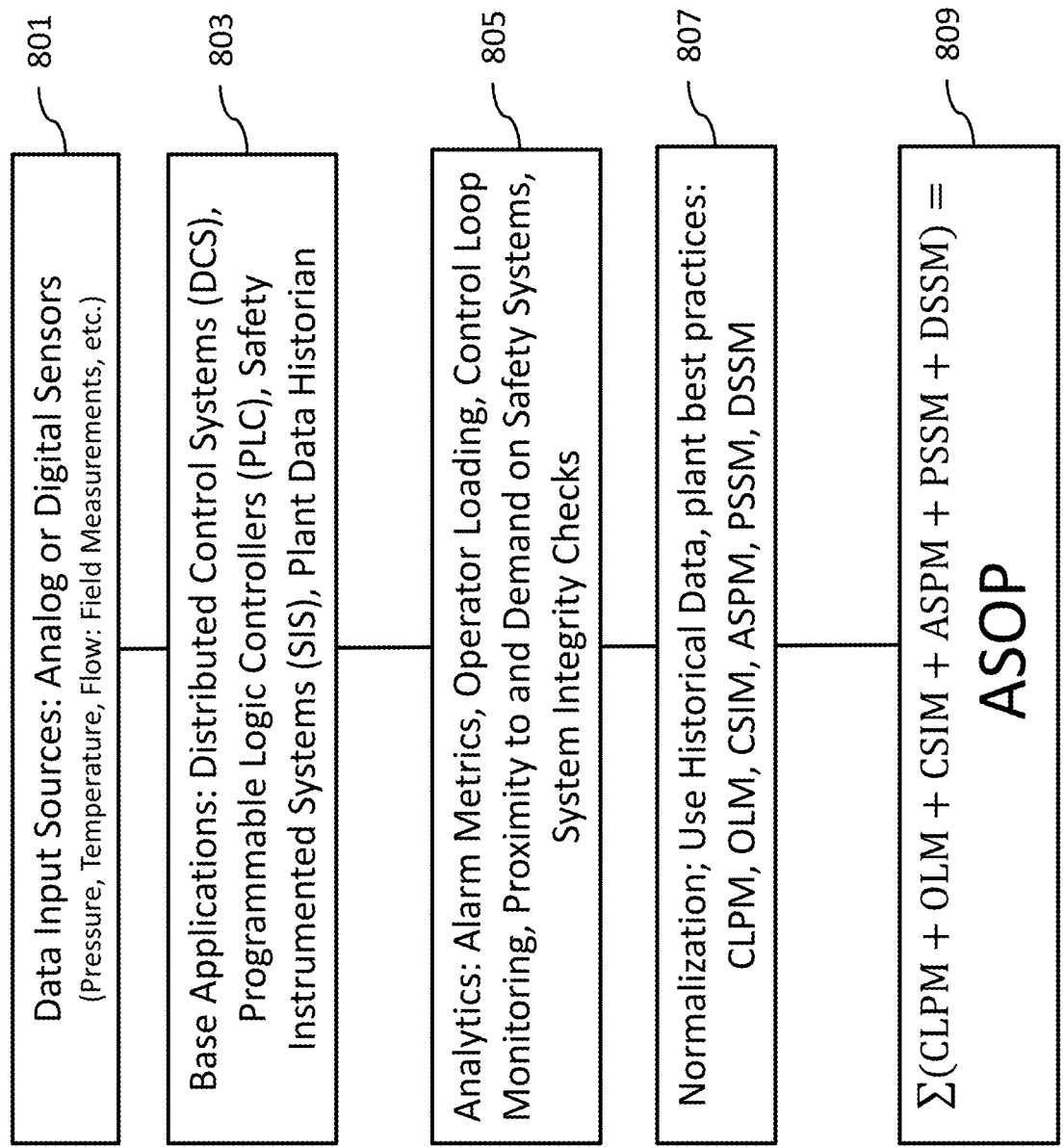
FIG. 8 is a diagram of the flowchart for the data flow in determining ASOP metrics.

A schematic flow chart of the derivation of the ASOP System and Method is illustrated in FIG. 8. Starting with the data input sources (sensors) 801, which may be analog or digital sensors, the data are collected and processed in Base Applications 803 such as distributed control systems (DCS), Programmable Logic Controllers (PLCs) and Safety Instrumented Systems (SIS). The data from the base applications are systematically analyzed 805 to determine the ASOP Metrics for a facility's parameters, properties, alarm systems, operator loading, controllability performance, safety systems and control systems integrity. The ASOP metrics are then normalized 807 and presented to the operator to provide a consolidated view of the process. For example, the normalized values between zero and one representing the ASOP Metrics: ASPM, OLM, CLPM, PSSM, DSSM and CSIM 809.

Figure 9:
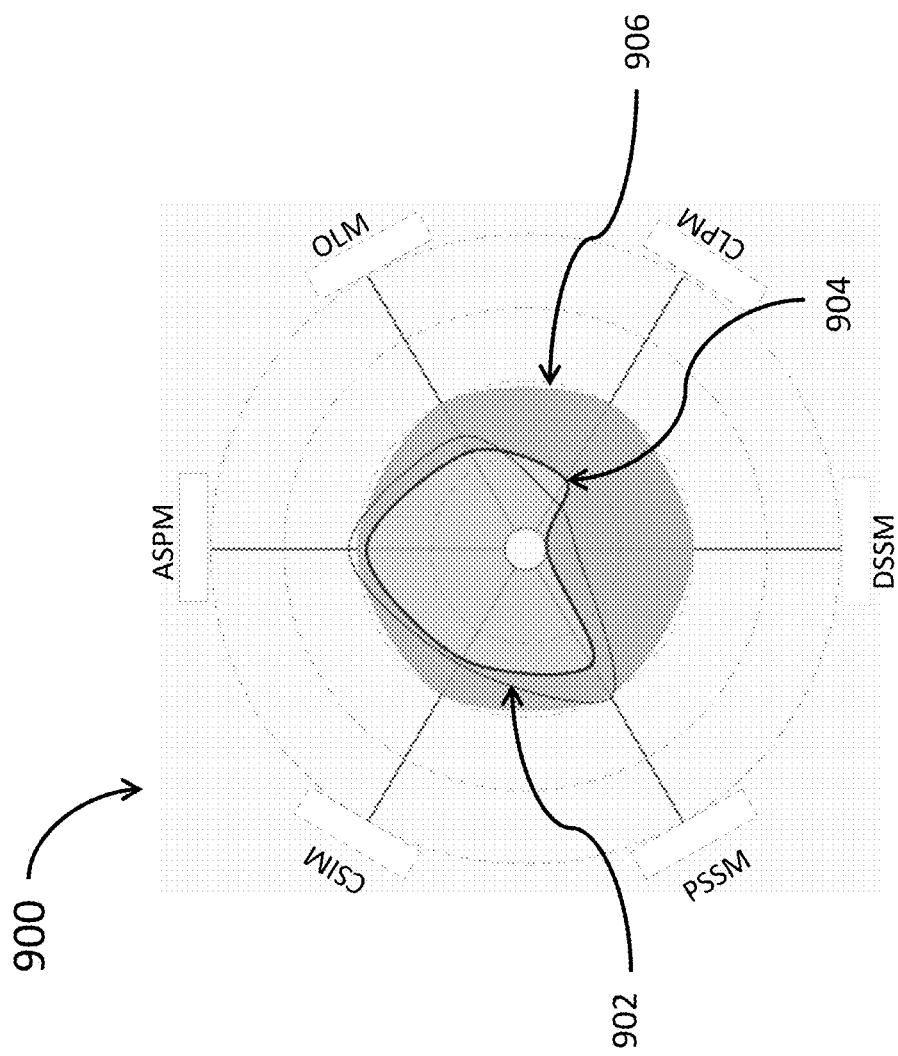
FIG. 9 is an example of 'radar plot' based operator interface to show the snapshot and temporal evolution view of ASOP metrics.

The composite ASOP metric, along with its sub-metrics may be used collectively or individually to measure automation, safety and operations performance. FIG. 9 shows an operator interface using a 'radar plot' that captures a snapshot view of the current performance using the ASOP metrics as well as provides a time trajectory of the metrics to provide evolution context. The display 900 comprises normalized values on the radii of the ASPM, OLM, CLPM, DSSM, PSSM and CSIM. The region of sustainable operations is within the area encompassed by line 906. A selected temporal value of operations 902 may represent a historical contrast, or delta, to current facility operational metrics as represented by line 904. This view enables operators with comprehensive situational awareness by grouping relevant information providing a dynamic view of operations.

Figure 10:
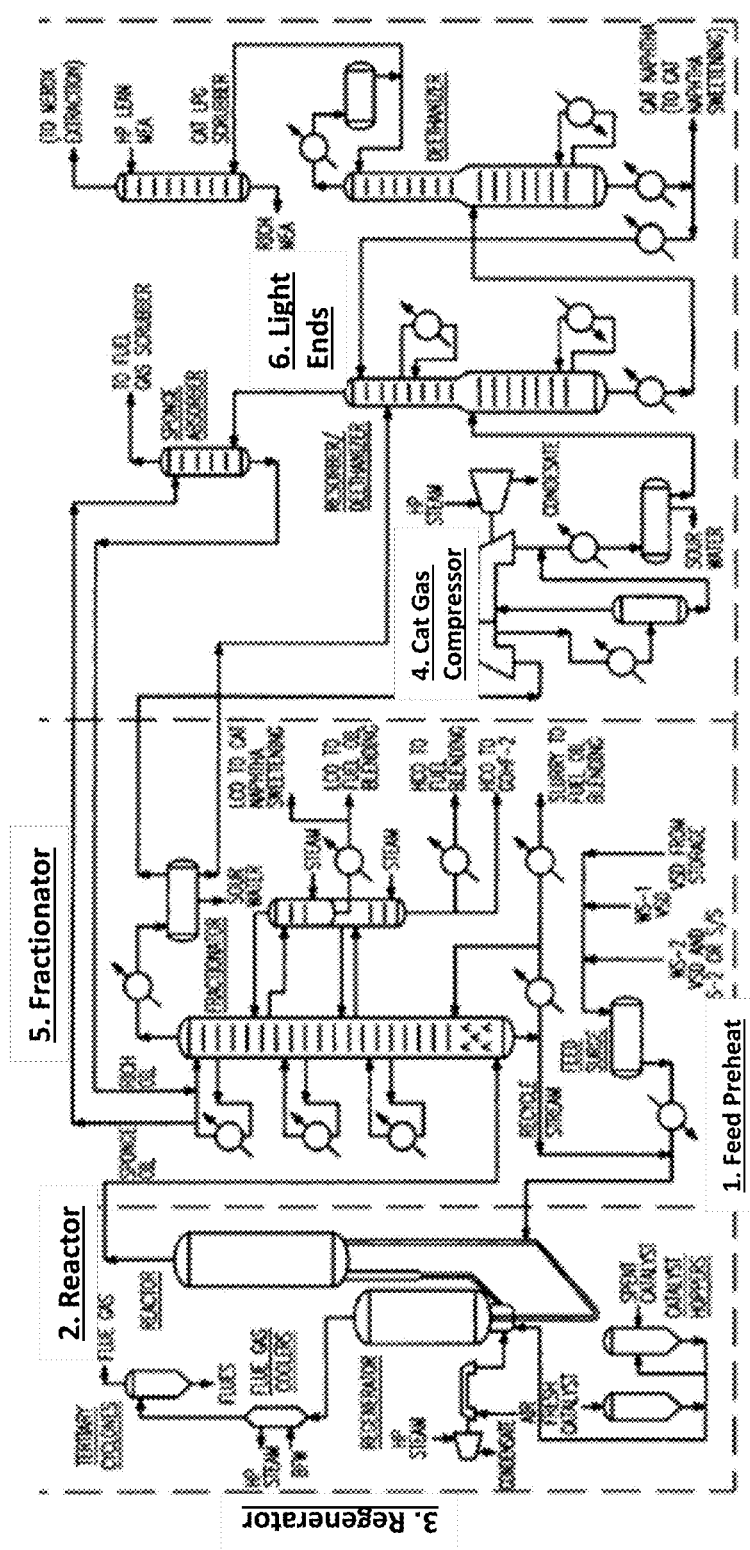
FIG. 10 shows a typical layout of the Fluidized Catalytic Cracking Unit (FCCU).
Figure 11:
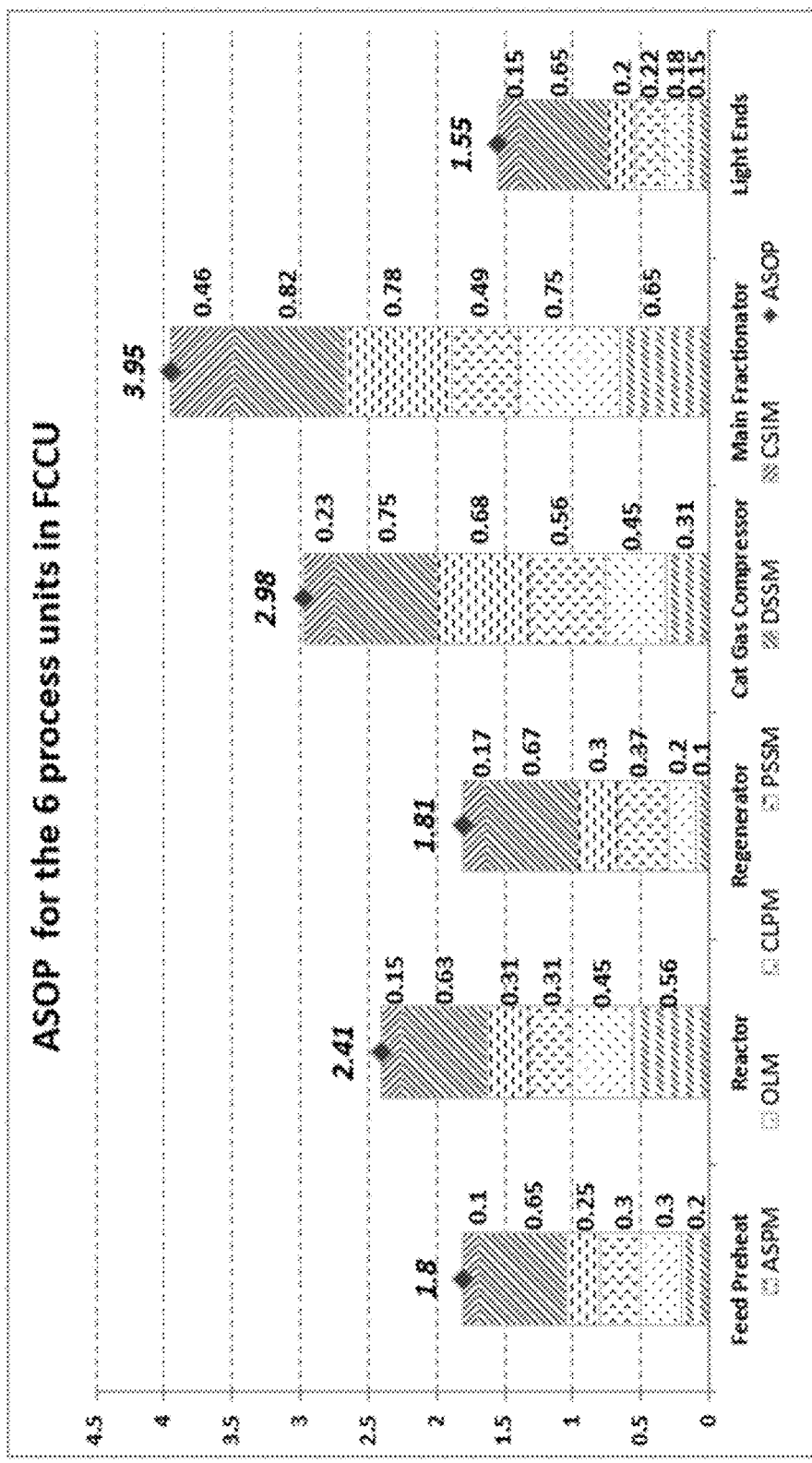
FIG. 11 illustrates an embodiment having six FCCU consoles with corresponding ASOP metrics in a chart view.
Figure 12:
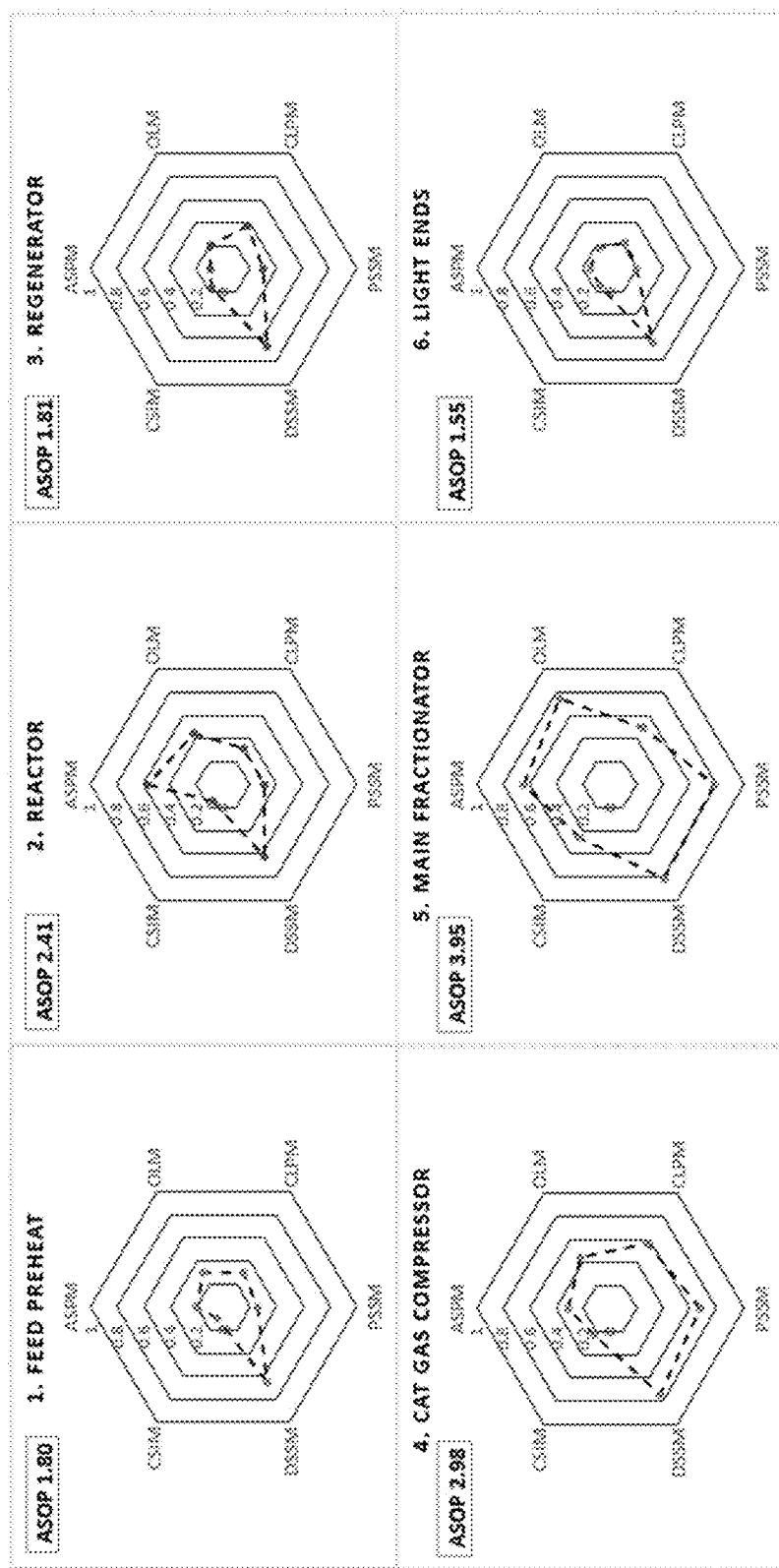
FIG. 12 illustrates the information shown in FIG. 11 in a 'radar plot' view.

These metrics can be developed for any process—a continuous one, such as the fluidized catalytic cracking unit (FCCU) in a refinery; alternatively a semi-continuous process such as the coking unit in a refinery or a batch process such as a polymer unit. To illustrate the use of these metrics, we consider an application to the FCCU (FIG. 10). The FCCU is widely considered the heart of the refinery process as it converts heavy oils into more valuable gasoline and lighter products. It is a highly complex and tightly integrated system comprising six units—feed preheat unit, reactor, regenerator, cat gas compressor, main fractionator and downstream light ends processing units. Undetected abnormal process operations in such a dynamic, complicated unit can easily escalate into serious problems that can have significant safety and economic implications ranging from lost production, equipment damage, environmental emissions and injuries. The process operator's main responsibility is to monitor operations to identify any developing abnormalities and implement corrective actions in a timely manner. To this end, the ASOP metrics provide a quick 'health-check' for operations. FIG. 11 illustrates the ASOP metrics for the six units in a chart view. The ASOP values for the units can be compared against units in similar FCCUs within the organization to evaluate relative performance. An alternate view of the process is shown through the chart view in FIG. 12, radar plots for the six FCCU processing units. Since the individual metrics are normalized on each display, the distance from the center to the perimeter of the hexagon for each metric is 1.0. In this 'radar plot', warnings and alerts can be set at varying thresholds and the points color coded for visual indications. This allows the operator to assess the state of the operations at a glance. Also, this view allows for showing the prior positions of the metrics (see FIG. 9), allowing the operator to gauge the 'delta' movement in each, thus providing historical reference. This would indicate 'worsening' or 'improving' performance and allow the operator to focus on the poorly performing metrics.

Figure 13:
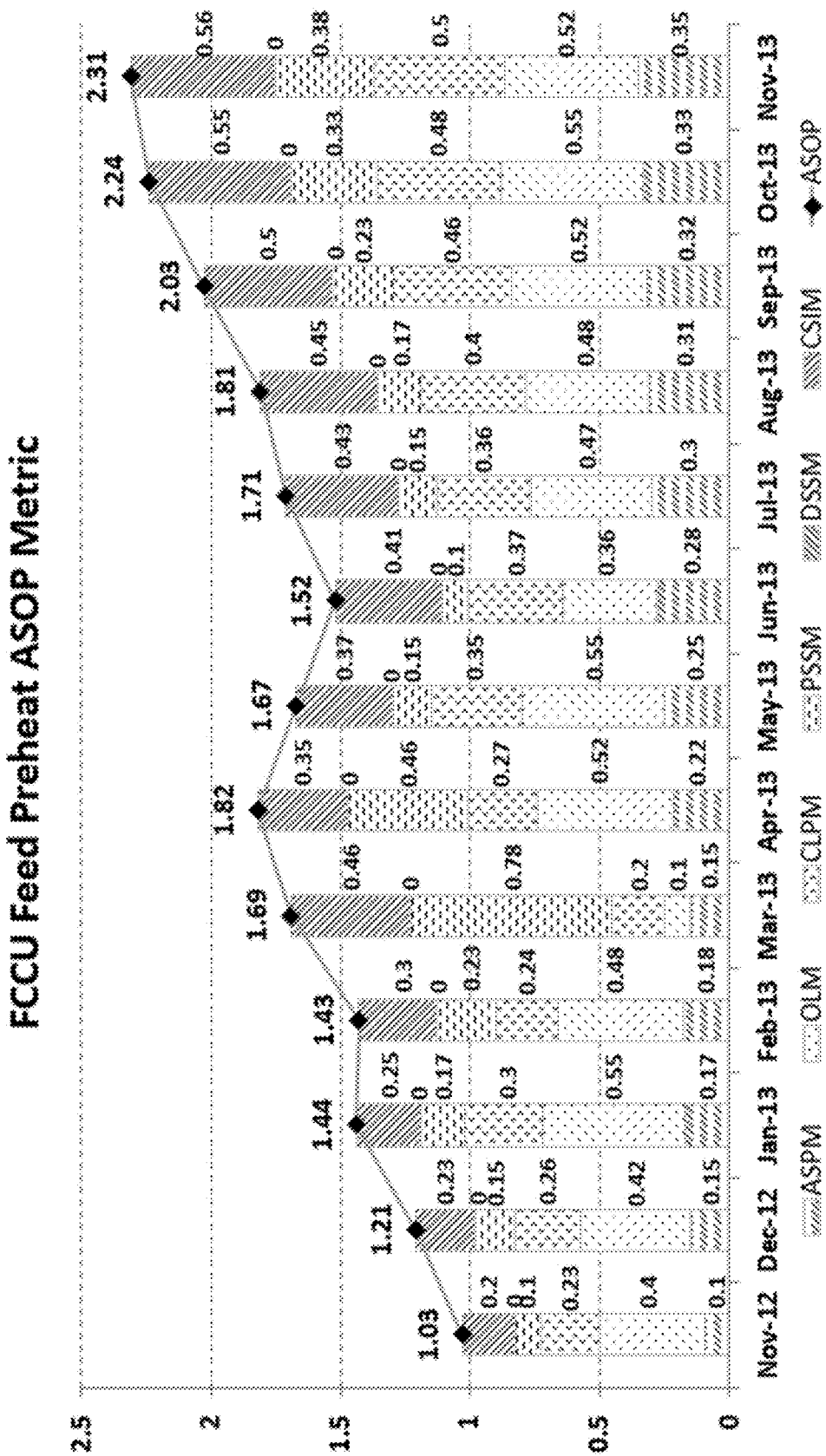
FIG. 13 illustrates an exemplary embodiment wherein the Feed Preheat Console is selected for a more detailed ('drill down') view showing contributions of each ASOP metric over time.

To enable drill-down further into the data contributing to the metrics, FIG. 13 illustrates using example data the Feed Preheat ASOP metric evolution, with the breakdown of the sub-metrics. As the plot illustrates, the ASOP value in this example data has been trending upwards over the year, thus indicating worsening performance. Further, the decomposition of the ASOP metric into its components also allow for 'drilling down' to the root cause thus allowing for proactive corrective action. A value of '0' is indicated for the DSSM position, illustrating that a trip limit was not violated during the example time period. Thus the ASOP metric acts as a leading indicator to detect deteriorating performance for a unit as well as compare performance against similar units (benchmarking).

Figure 14:
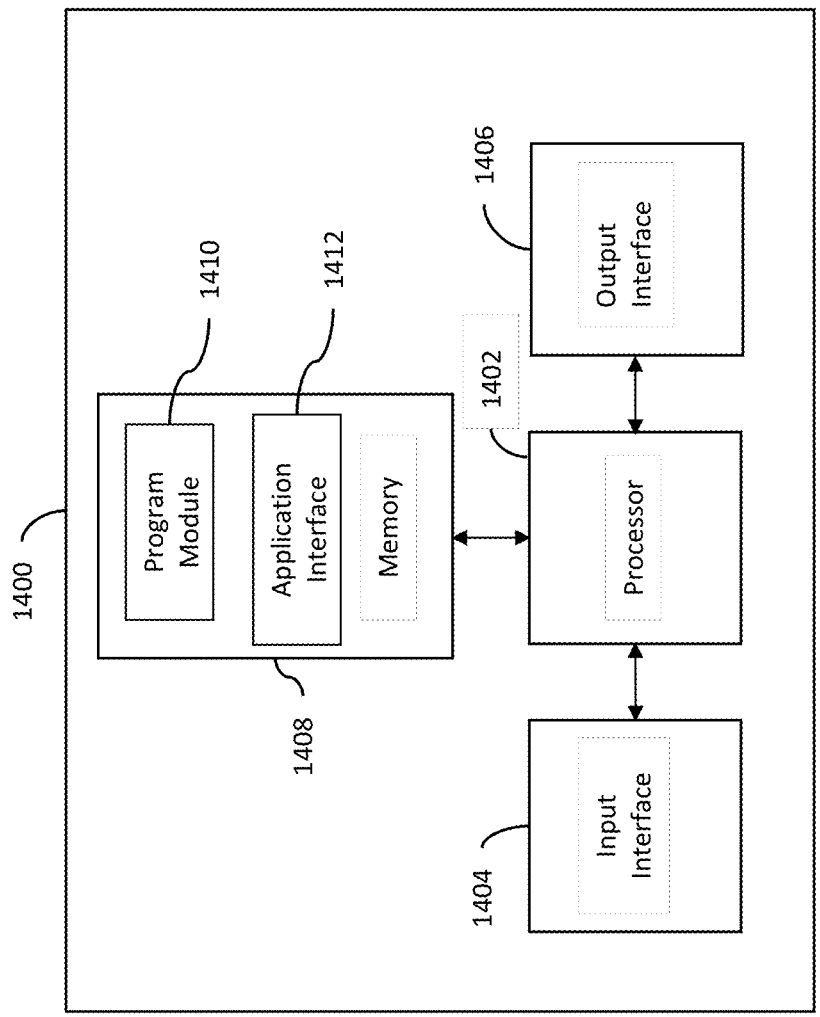
FIG. 14 illustrates a computer and computer system for providing ASOP methods and systems.

FIG. 14 is a schematic diagram of an embodiment of a system 1400 that may correspond to or may be part of a computer, computing system and/or any other computing device, such as a workstation, server, mainframe, super computer, processing graph and/or database. System 1400 may be associated with computerized ASOP systems and methods that collect and analyze sensor data collected from an operation over a network, using the data to determine Automation, Safety, and Operations Performance (ASOP)

metrics or factors indicative of the performance of a given operation, distributing the data and/or one or more of the calculated factors across a computer network, normalizing, recording and displaying the metrics calculated according to the algorithms disclosed herein, thereby providing operation personnel significantly increased comprehension of entire operational systems to enable early and timely indications of system abnormalities so that corrective actions can be effective in preventing major problems.

The system 1400 includes a processor 1402, which may be also be referenced as a central processor unit (CPU). The processor 1402 may communicate and/or provide instructions to other components within the system 1400, such as the input interface 1404, output interface 1406, and/or memory 1408. In one embodiment, the processor 1402 may include one or more multi-core processors and/or memory (e.g., cache memory) that function as buffers and/or storage for data. In alternative embodiments, processor 1402 may be part of one or more other processing components, such as application specific integrated circuits (ASICs), field-programmable gate arrays (FPGAs), and/or digital signal processors (DSPs). Although FIG. 14 illustrates that processor 1402 may be a single processor, it will be understood that processor 1402 is not so limited and instead may represent a plurality of processors including massively parallel implementations and processing graphs comprising mathematical operators connected by data streams. The processor 1402 may be configured to implement any of the methods described herein.

FIG. 14 illustrates that memory 1408 may be operatively coupled to processor 1402. Memory 1408 may be a non-transitory medium configured to store various types of data. For example, memory 1408 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 14, the memory 1408 may be used to house the instructions for carrying out various embodiments described herein. In an embodiment, the memory 1408 may comprise a computer program module 1410 that may be accessed and implemented by processor 1402. Alternatively, application interface 1412 may be stored and accessed within memory by processor 1402. Specifically, the program module or application interface may perform signal processing and/or conditioning of the sensor data acquired and described herein.

Programming and/or loading executable instructions onto memory 1408 and processor 1402 in order to transform the system 1400 into a particular machine or apparatus that operates on time series data is well known in the art. Implementing instructions, real-time monitoring, and other functions by loading executable software into a computer can be converted to a hardware implementation by well-known design rules. For example, decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or application specific hardware that hardwires the instructions of the software. In the same manner as a machine controlled by a new ASIC is a particular machine or apparatus, likewise a computer that has been programmed and/or loaded with executable instructions may be viewed as a particular machine or apparatus.

In addition, FIG. 14 illustrates that the processor 1402 may be operatively coupled to an input interface 1404 configured to obtain the time-series sensor data and output interface 1406 configured to output and/or display the results or pass the results to other processing. The input interface 1404 may be configured to obtain the operations' data via sensors, cables, connectors, and/or communication protocols. In one embodiment, the input interface 1404 may be a network interface that comprises a plurality of ports configured to receive and/or transmit acquired data via a network. In particular, the network may transmit the acquired data via wired links, wireless link, and/or logical links. Other examples of the input interface 1404 may be universal serial bus (USB) interfaces, CD-ROMs, DVD-ROMs. The output interface 1406 may include, but is not limited to one or more connections for a graphic display (e.g., monitors), for example the radar plots disclosed herein or other displays as disclosed and/or a printing device that produces hard-copies of the generated results.

In one nonlimiting embodiment a system for monitoring a control system in a facility using performance metrics comprises a specially programmed computer system for electronically and automatically receiving, over a computer network, from at least one sensor in the processing facility, sensor data, wherein the received sensor data are measurements from the facility's parameters, properties, alarm systems, operator action tracking systems, control loops, safety systems, and distributed control systems' integrity.

Other aspects of the system may comprise alarm control systems' performance measured using sub-metrics that comprise alarm floods, chattering alarms, stale alarms, disabled alarms and frequently occurring alarms. The alarm system performance may be normalized using set weight contributions for sub-metrics. Also the performance of the operator action tracking systems may be measured using sub-metrics comprising alarm system performance, set point changes and other operator initiated changes. The performance of operator action tracking systems may be normalized using set weight contributions for sub-metrics. The performance of control loops may be measured using a normalized deviation calculation. The safety systems may comprise a proximity to safety systems performance that is determined using a normalized approach calculation. The safety systems may also comprise a demand on safety systems performance that is determined using a normalized safety system activations calculation. The distributed control system integrity may comprise a control system integrity performance that is determined using sub-metrics comprising control system changes and control system defects. The control system changes sub-metric may be determined using changes in tags, graphics and programs. The control system changes sub-metric may be normalized using set weight contributions for tag changes, graphic changes and program changes.

The control system defects metric may be measured using broken references and control files defects. The control system defects sub-metric may be normalized using set weight contributions for broken references and control file defects. The system may further comprise an operator interface. The operator interface may include a continuous indication of normality per the metrics and also a 'drill-down' to the sub-metrics to diagnose the root cause of the sub-par performance.

In another nonlimiting embodiment, a computer-implemented method is provided for monitoring control systems in a facility using performance metrics comprising electronically and automatically receiving, by a specially programmed computer system, over a computer network, from at least one sensor in the facility, sensor data, wherein the received sensor data are measurements from the facility's parameters, properties, alarm systems, operator action tracking systems, control loops systems, safety systems and distributed control systems' integrity.

Other aspects of the method may comprise electronically and automatically receiving, by a specially programmed computer system, over a computer network, from at least one sensor in the facility, sensor data, wherein the received sensor data are digital or analog representations of at least one selected from the list consisting of: i) temperature data, ii) pressure data, iii) flow data, iv) level data and v) control valve output data. The sensor data may be normalized using historical data or using set weight contributions. Normalized sensor data may be displayed in an operator interface for continuous view. The received sensor data from the facility's parameters, properties, alarm systems, operator action tracking systems, control loops, safety systems and distributed control systems' integrity may be each graphically expressed, as a value, on equidistantly radial axes, each value normalized from zero to one. The method may further comprise calculating an Alarm System Performance Metric using a) the percentage of hours containing more than a specified number of alarms, b) the percentage of alarms in flood, c) the percentage of chattering alarms, d) the percentage of stale alarms, e) the percentage of disabled alarms, and f) the percentage of frequently occurring alarms. Further, the method may comprise calculating an Operator Loading Metric using a) the Alarm System Performance Metric, b) a Set Point Changes Metric and c) an Other Operator Changes Metric. In addition, the method may comprise calculating a Controllability Performance Metric using, for each of a plurality of controllers in a distributed control system, i) the average value of the absolute difference between a Present Value and a Target Value over an interval, ii) the average value divided by a denominator comprising the error standard deviation over an interval multiplied by a factor of standard deviation normalization, and (iii) averaging the summed result over the number of controllers. Further still, the method may comprise calculating a Proximity to Safety System Metric using a) process area between alarm/trip limit pairs, b) a count of limit pairs and c) a time window of calculation, such that a summation of measured excursions between limit pairs is expressed in time-percentage. The method may also comprise calculating a Demand on Safety System Metric computed as the number of times a system trip limit has been exceeded. Additionally, the method may comprise a Tag Changes Metric, calculated as tag changes relative to a total tag count, a Graphic Changes Metric, calculated as a number of graphic changes relative to the total graphic count, a Program Changes Metric, calculated as a number of program changes relative to a total program count, a Broken References Metric, calculated as a number of broken references relative to a total number of references and a Control Files Defects Metric, calculated as a number of control files with defects relative to a total number of control files. With this method, a composite metric may be the sum of the received sensor data for each of the facility's parameters, properties, alarm systems, operator action tracking systems, control loops, safety systems comprising proximity to safety systems and demand on safety systems, and distributed control systems' integrity, wherein each systems' values are normalized from zero to one or some other arbitrary maximum. Additionally, the composite metric can be used to compare current plant performance against historical performance or used to compare current plant performance against similar units. The facility may be a chemical processing facility, a petrochemical processing facility or a refining facility.

In still another nonlimiting embodiment, an apparatus for applying a computer-implemented method for monitoring control systems in a facility using performance metrics is provided, the apparatus comprises at least one facility sensor connected to a computer network, a computer network for electronically and automatically receiving, from at least one sensor in the facility, sensor data, wherein the received sensor data are measurements from the facility's parameters, properties, alarm systems, operator action tracking systems, control loops systems, safety systems and distributed control systems' integrity, a specially programmed computer system for performing a computer-implemented method for monitoring control systems by calculating performance metrics from measurements received over the computer network from facility sensors and a display device for displaying normalized performance metrics from the facility sensors.

Other aspects of the apparatus may include that the specially programmed computer receives facility sensor data that are digital or analog representations of at least one selected from the list consisting of: i) temperature data, ii) pressure data, iii) flow data, iv) level data and v) control valve output data. The specially programmed computer system may normalize the performance metrics using historical data or using set weight contributions. The display device may display normalized sensor data in an operator interface for continuous view. The display device may also display normalized sensor data from the facility's parameters, properties, alarm systems, operator action tracking systems, control loops, safety systems and distributed control systems' integrity, which may be graphically expressed, as a value, on equidistantly radial axes, each value normalized from zero to one.

The specific structural and functional details of the above-described embodiments are not to be interpreted as limiting, but merely as a representative basis for teaching one skilled in the art to variously employ the present invention. Accordingly, the terminology employed throughout should be read in a non-limiting manner. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions

The invention claimed is:

1. A system, comprising:
a plurality of sensors, positioned within a facility;
at least one specially programmed computer processor that is configured to:
automatically receive, over a computer network, from the plurality of sensors in the facility, current performance data from a plurality of distinct sources associated with a plurality of distinct process units of at least one process, being performed at the facility;
wherein the received current performance data comprises measurements representative of an overall automation, safety and operations (ASOP) performance associated with the at least one process that is being performed at the facility;
execute at least one base application to:
i) determine at least one sub-metric, wherein the at least one sub-metric that is chosen from: at least one automation-related metric, at least one safety-related metric, and at least one operations-related metric,
ii) normalize the at least one sub-metric to form at least one normalized sub-metric, and
iii) determine at least one ASOP metric for at least one distinct source associated with at least one distinct process unit of the at least one process based at least in part on the at least one normalized sub-metric;
determine that the at least one ASOP metric is a proximity-to-safety system metric (PSSM) that is representative of an amount of time a process excursion from at least one pre-determined value of at least one process parameter is at risk of triggering a safety response, and is based on a process area between each respective alarm-trip limit pairs, a number of alarm-trip limit pairs, and a rolling time window; and
generate, based at least in part on the at least one ASOP metric, at least one dynamic graphical user interface having at least one dynamic graphical representation configured to visually convey a current overall performance state of the at least one process at the facility.

2. The system of claim 1, wherein the at least one ASOP metric either is, or includes, an alarm system performance metric (ASPM); and wherein the at least one specially programmed computer processor is further configured to:
i) determine a plurality of alarm-related sub-metrics, chosen from:
1) an ALMH metric, identifying a percentage of hours containing more than a specified number of alarms being activated,
2) an ALMF metric, identifying a percentage of time in flood,
3) an ALMC metric, identifying a percentage of chattering alarms,
4) an ALMS metric, identifying a percentage of stale alarms,
5) an ALMD metric, identifying a percentage of disabled alarms, and
6) an ALMFO metric, identifying a percentage of frequently occurring alarms;
ii) normalize the plurality of alarm-related sub-metrics to form a plurality of normalized alarm-related sub-metrics; and
iii) determine the ASPM for the at least one distinct source associated with the at least one distinct process unit of the at least one process based at least in part on the plurality of normalized alarm-related sub-metrics.

3. The system of claim 2, wherein the plurality of alarm-related sub-metrics is normalized using a set of respective weight contributions.

4. The system of claim 2, wherein the at least one ASOP metric is an operator loading metric (OLM); and wherein the at least one specially programmed computer processor is further configured to:
i) determine a plurality of operator-related sub-metrics, chosen from:
1) the ASPM,
2) a setpoint changes metric (SPCM), and
3) other operator initiated changes metric (OPCM);
ii) normalize the plurality of operator-related sub-metrics to form a plurality of normalized operator-related sub-metrics; and
iii) determine the OLM for the at least one distinct source associated with the at least one distinct process unit of the at least one process based at least in part on the plurality of normalized operator-related sub-metrics.

5. The system of claim 4 wherein the plurality of operator-related sub-metrics is normalized using a set of respective weight contributions.

6. The system of claim 1, wherein the at least one ASOP metric is a controllability performance metric (CLPM) that is based on a variability in a difference between each respective current value and each respective target value for each respective performance of control loop associated with the at least one process is measured using a normalized deviation calculation.

7. The system of claim 1, wherein the current performance data comprises at least one type of data chosen from: i) temperature data, ii) pressure data, iii) flow data, iv) level data and v) control valve output data.

8. The system of claim 1, wherein the at least one sub-metric is normalized based on historical data.

9. The system method of claim 1, wherein the at least one specially programmed computer processor is further configured to continuously update, based at least in part on the at least one ASOP metric, the at least one dynamic graphical representation of the at least one dynamic graphical user interface to visually convey a continuous overall performance state of the at least one process at the facility.

10. The system of claim 1, wherein the at least one ASOP metric corresponds to a value, on equidistantly radial axes, each value normalized from zero to one.

11. A computer-implemented method, comprising:
providing a plurality of sensors, positioned within a facility;
automatically receiving, by at least one specially programmed computer processor, over a computer network, from the plurality of sensors in the facility, current performance data from a plurality of distinct sources associated with a plurality of distinct process units of at least one process, being performed at the facility;
wherein the received current performance data comprises measurements representative of an overall automation, safety and operations (ASOP) performance associated with the at least on process that is being performed at the facility;

executing, by the at least one specially programmed computer processor, at least one base application to:
i) determine at least one sub-metric, wherein the at least one sub-metric that is chosen from: at least one automation-related metric, at least one safety-related metric, and at least one operations-related metric,
ii) normalize the at least one sub-metric to form at least one normalized sub-metric, and
iii) determine at least one ASOP metric for at least one distinct source associated with at least one distinct process unit of the at least one process based at least in part on the at least one normalized sub-metric;
determining, by the at least one specially programmed computer processor, that the at least one ASOP metric is a proximity-to-safety system metric (PSSM) that is representative of an amount of time a process excursion from at least one pre-determined value of at least one process parameter is at risk of triggering a safety response, and is based on a process area between each respective alarm-trip limit pairs, a number of alarm-trip limit pairs, and a rolling time window; and
generating, by the at least one specially programmed computer processor, based at least in part on the at least one ASOP metric, at least one dynamic graphical user interface having at least one dynamic graphical representation configured to visually convey a current overall performance state of the at least one process at the facility.

12. The method of claim 11, wherein the at least one ASOP metric either is, or includes, an alarm system performance metric (ASPM); and wherein the at least one specially programmed computer processor is further configured to:
i) determine a plurality of alarm-related sub-metrics, chosen from:
1) an ALMH metric, identifying a percentage of hours containing more than a specified number of alarms being activated,
2) an ALMF metric, identifying a percentage of time in flood,
3) an ALMC metric, identifying a percentage of chattering alarms,
4) an ALMS metric, identifying a percentage of stale alarms,
5) an ALMD metric, identifying a percentage of disabled alarms, and
6) an ALMFO metric, identifying a percentage of frequently occurring alarms;
ii) normalize the plurality of alarm-related sub-metrics to form a plurality of normalized alarm-related sub-metrics; and
iii) determine the ASPM for the at least one distinct source associated with the at least one distinct process unit of the at least one process based at least in part on the plurality of normalized alarm-related sub-metrics.

13. The method of claim 12, wherein the plurality of alarm-related sub-metrics is normalized using a set of respective weight contributions.

14. The method of claim 12, wherein the at least one ASOP metric is an operator loading metric (OLM); and wherein the at least one specially programmed computer processor is further configured to:
i) determine a plurality of operator-related sub-metrics, chosen from:
1) the ASPM,
2) a setpoint changes metric (SPCM), and
3) other operator initiated changes metric (OPCM);
ii) normalize the plurality of operator-related sub-metrics to form a plurality of normalized operator-related sub-metrics; and
iii) determine the OLM for the at least one distinct source associated with the at least one distinct process unit of the at least one process based at least in part on the plurality of normalized operator-related sub-metrics.

15. The method of claim 14, wherein the plurality of operator-related sub-metrics is normalized using a set of respective weight contributions.

16. The method of claim 11, wherein the at least one ASOP metric is a controllability performance metric (CLPM) that is based on a variability in a difference between each respective current value and each respective target value for each respective control loop associated with the at least one process.

17. The method of claim 11, wherein the current performance data comprises at least one type of data chosen from: i) temperature data, ii) pressure data, iii) flow data, iv) level data and v) control valve output data.

18. The method of claim 11, wherein the at least one sub-metric is normalized based on historical data.

19. The method of claim 11, wherein the at least one specially programmed computer processor is further configured to continuously update, based at least in part on the at least one ASOP metric, the at least one dynamic graphical representation of the at least one dynamic graphical user interface to visually convey a continuous overall performance state of the at least one process at the facility.

20. The method of claim 11, wherein the at least one ASOP metric corresponds to a value, on equidistantly radial axes, each value normalized from zero to one.

* * * * *